(12) United States Patent
Truesdale et al.

(10) Patent No.: US 10,647,019 B2
(45) Date of Patent: May 12, 2020

(54) BASE FOR A TRIM ROUTER

(71) Applicant: Robert Bosch GmbH, Stuttgart (DE)

(72) Inventors: Timothy L. Truesdale, Lindenhurst, IL (US); Arturo Gonzalez, Arlington Heights, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 706 days.

(21) Appl. No.: 15/106,125

(22) PCT Filed: Dec. 23, 2014

(86) PCT No.: PCT/US2014/072126
§ 371 (c)(1),
(2) Date: Jun. 17, 2016

(87) PCT Pub. No.: WO2015/100311
PCT Pub. Date: Jul. 2, 2015

(65) Prior Publication Data
US 2016/0318204 A1 Nov. 3, 2016

Related U.S. Application Data

(60) Provisional application No. 61/920,901, filed on Dec. 26, 2013.

(51) Int. Cl.
*B27C 5/10* (2006.01)
*B23Q 16/02* (2006.01)
*B23Q 9/00* (2006.01)

(52) U.S. Cl.
CPC .............. *B27C 5/10* (2013.01); *B23Q 9/0028* (2013.01); *B23Q 16/02* (2013.01); *Y10T 409/306608* (2015.01); *Y10T 409/307952* (2015.01)

(58) Field of Classification Search
CPC .......... B27C 5/10; B27C 5/02; B23Q 9/0028; B23Q 16/02; B23Q 16/00;
(Continued)

(56) References Cited

U.S. PATENT DOCUMENTS

| 528,074 | A | * | 10/1894 | Carpenter | B25B 1/125 269/182 |
| 2,491,543 | A | * | 12/1949 | Alfonso | B23D 21/08 30/102 |

(Continued)

FOREIGN PATENT DOCUMENTS

| CN | 2316872 Y | 5/1999 |
| CN | 1894072 A | 1/2007 |

(Continued)

OTHER PUBLICATIONS

Bosch GKF125CE Colt variable.*
(Continued)

*Primary Examiner* — Monica S Carter
*Assistant Examiner* — Mahdi H Nejad
(74) *Attorney, Agent, or Firm* — Maginot, Moore & Beck LLP

(57) ABSTRACT

A tool support incorporates height adjustment and locking features in common components. A pivoting door is used to control the engagement of a height adjustment threaded shaft with the bearing flange of the power tool, with the position of the pivoting door controlled by a manual actuator. In one position the manual actuator allows the door to pivot outward to disengage the height adjustment shaft from the bearing flange. In a second position the manual actuator moves the door to engage the height adjustment shaft with the bearing flange to permit "micro" height adjustment by rotation of the height adjustment shaft. In a third position the
(Continued)

manual actuator presses the door into the height adjustment shaft to effectively lock the shaft in position.

19 Claims, 18 Drawing Sheets

(58) Field of Classification Search
CPC . Y10T 409/306608; Y10T 409/307952; Y10T 409/308176; Y10T 409/308624; Y10T 74/19735; B25F 5/021; B25F 5/02; B23C 1/20; B23C 2255/00; B23C 2255/04; B23C 2255/08; B23C 2255/12; B25B 5/10; B25B 5/12; B25B 5/122; B25B 5/16; B25B 1/125; B25B 5/101; F16B 39/10; F16B 35/005; A47C 19/045; A61G 7/012; B23B 2260/048; B23B 2260/0482; B23B 2260/0485; B23B 2260/01
USPC ............. 409/182, 136.95, 154.5; 227/142; 269/182, 228, 249; 411/393, 120, 432; 222/390; 144/136.95
See application file for complete search history.

(56) References Cited

U.S. PATENT DOCUMENTS

| | | | |
|---|---|---|---|
| 2,631,357 A * | 3/1953 | Gobel | B23B 51/05 269/174 |
| 5,088,865 A | 2/1992 | Beth et al. | |
| 5,941,152 A * | 8/1999 | Kim | B23D 47/04 269/181 |
| 6,599,293 B2 * | 7/2003 | Tague | A61B 17/8822 222/390 |
| 7,455,488 B2 * | 11/2008 | Carlson | B23Q 16/024 409/182 |
| 7,758,274 B2 * | 7/2010 | Paul | A61B 17/00 403/104 |
| D740,097 S * | 10/2015 | Truesdale | D8/67 |
| 2002/0043294 A1 | 4/2002 | McDonald et al. | |
| 2005/0006000 A1 * | 1/2005 | Freese | B27C 5/10 144/136.95 |
| 2006/0008334 A1 | 1/2006 | Kageler et al. | |
| 2006/0078395 A1 * | 4/2006 | Cooper | B25F 5/00 409/182 |
| 2006/0086417 A1 | 4/2006 | Griffin et al. | |
| 2006/0102248 A1 | 5/2006 | Cooper et al. | |
| 2010/0126627 A1 * | 5/2010 | Goddard | B25F 5/003 144/136.95 |
| 2010/0146763 A1 | 6/2010 | Griffin et al. | |
| 2010/0215453 A1 * | 8/2010 | Ceroll | B27C 5/10 409/182 |
| 2011/0001283 A1 * | 1/2011 | Seber | B25B 1/125 269/173 |
| 2014/0178142 A1 * | 6/2014 | Tan | B23Q 9/0028 409/178 |

FOREIGN PATENT DOCUMENTS

| | | |
|---|---|---|
| CN | 201009086 Y | 1/2008 |
| CN | 201195252 Y | 2/2009 |
| EP | 2 163 361 A2 | 3/2010 |

OTHER PUBLICATIONS

Bosch PR101 Fixed Router Base.*
International Search Report corresponding to PCT Application No. PCT/US2014/072126, dated Apr. 7, 2015 (4 pages).

* cited by examiner

BASE FOR A TRIM ROUTER

PRIORITY CLAIM

This application is a 35 U.S.C. § 371 National Stage Application of PCT/US2014/072126, filed on Dec. 23, 2014, which claims the benefit of priority to U.S. provisional application No. 61/920,901, filed on Dec. 26, 2013, the entire disclosures of which are incorporated herein by reference.

BACKGROUND

The present disclosure relates to hand-held power tools, and more particularly hand-held power tools having a base for supporting the tool, such as trim routers.

One form of conventional trim router or laminate trimmer power tool is shown in FIGS. 1-2. The power tool 10 is carried by a tool support 12 that provides a base or foot plate 15 for supporting the tool on a workpiece. The tool support 12 includes a clamping cuff 14 that is configured to support the tool 10 with the working end 11 at a user-selected height above the workpiece. In order to adjust the working height, the tool support 12 includes a height adjustment assembly 20 with a thumb screw 22 that is used to manually rotate a threaded post 24 within a threaded socket defined between the tool 10 and the tool support 12. A clamping device 16 is provided to clamp opposite halves 12a, 12b of the support about the tool once the user-selected height has been attained.

As seen in FIGS. 1-2, the conventional tool support 12 for a trim router 10 relies upon two separate components at two locations on the support to adjust and fix the power tool at the desired working height. There is a need for an apparatus that simplifies the adjustment and locking features of a support for a power tool.

SUMMARY

The present disclosure contemplates a tool support that incorporates height adjustment and locking features in common components. In one aspect, a pivoting door is used to control the engagement of a height adjustment threaded shaft with the bearing flange of the power tool, with the position of the pivoting door controlled by a manual actuator. In one position the manual actuator allows the door to pivot outward to disengage the height adjustment shaft from the bearing flange. In a second position the manual actuator moves the door to engage the height adjustment shaft with the bearing flange to permit "micro" height adjustment by rotation of the height adjustment shaft. In a third position the manual actuator presses the door into the height adjustment shaft to effectively lock the shaft in position. It can be appreciated that a single component, the manual actuator, allows the tool operator to lock, unlock and perform height adjustment of the tool.

A tool support is provided for supporting a power tool at adjustable heights relative to a base of the tool support. In one aspect, the tool support includes a clamping cuff connected to the base and configured to receive the elongated body of the power tool therethrough at adjustable heights above a work surface. The body of the power tool includes a bearing flange in sliding engagement with the clamping cuff. The clamping cuff defines an opening with the bearing flange accessible through the opening and a door movably mounted to the clamping cuff for movement toward the bearing flange through the opening. In one feature, the door and the bearing flange each include a threaded half-bore that together form a threaded bore when the door is directly adjacent the bearing flange. A height adjustment mechanism includes a thumbwheel driven threaded shaft disposed between the door and the bearing flange and configured to threadedly engage the threaded half-bore in the bearing flange when the door and the bearing flange are directly adjacent such that rotation of the threaded shaft adjusts the height of the elongated body of the power tool relative to the base. An actuator is provided for selectively moving the door and the bearing flange directly adjacent to form the threaded bore.

In one aspect, the tool support includes a force generating component that generates a different force corresponding to the position of the actuator, with one force operable to push the door directly adjacent the bearing flange to form the threaded bore, and a greater force operable to squeeze the threaded shaft between the half-bores sufficiently to prevent vertical movement of the power tool relative to the base

DETAILED DESCRIPTION

Figure 1:
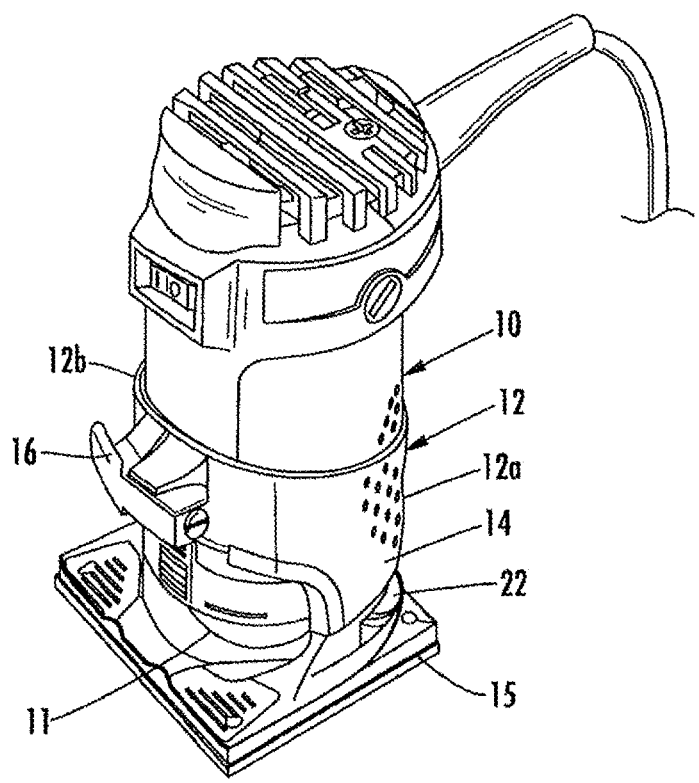
FIG. 1 is a perspective view of a conventional trim router and tool support.
Figure 2:
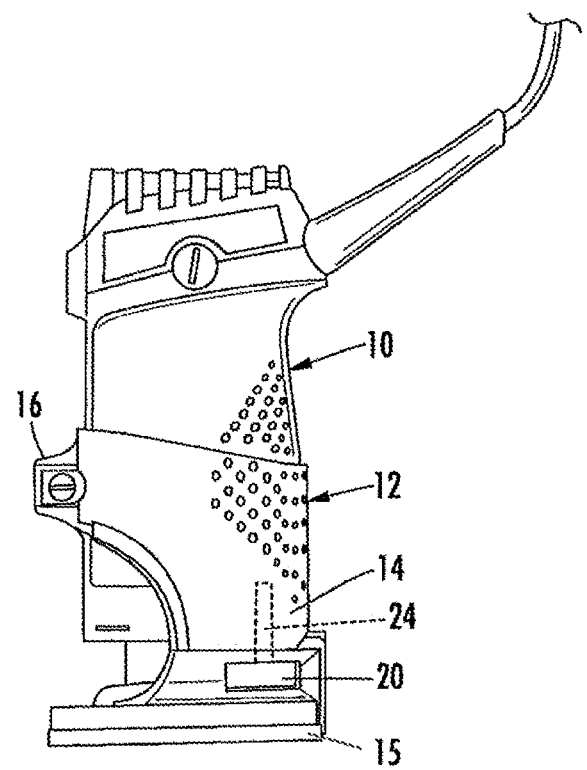
FIG. 2 is a side view of the conventional trim router shown in FIG. 1.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 3A:
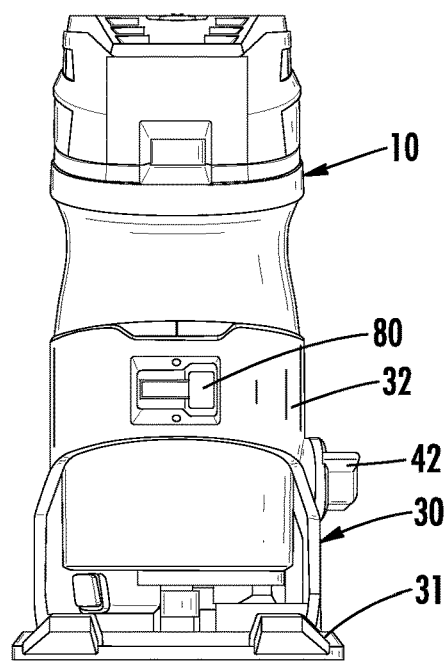
FIGS. 3a, 3b are front and side views of a tool support for a trim router according to one aspect of the present disclosure.
Figure 3B:
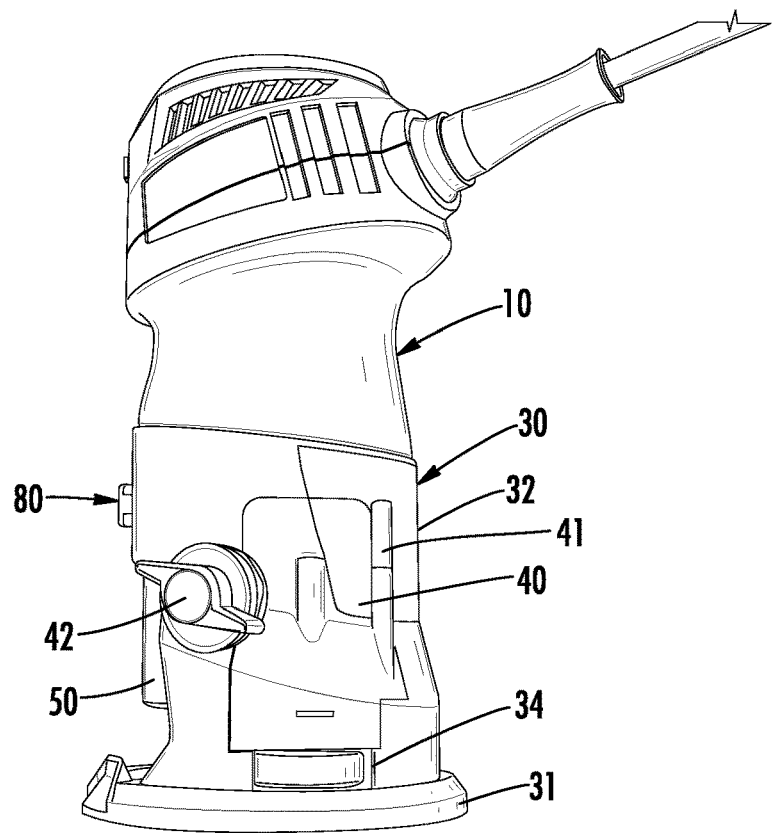

A tool as shown in FIGS. 3a-b mounted within a tool support 30 according to the present disclosure. The tool support 30 includes a base 31 configured to rest on the work surface, and a clamping cuff 32 configured to clamp to the bearing flange 50 of the power tool 10 at adjustable heights. The tool support may be provided with a safety lever assembly 80 that is configured and operates similar to the safety levers of prior devices. However, the safety lever assembly 80 is not required for the height adjustment and locking features of the tool support disclosed herein. In another embodiment, the safety lever assembly 80 may be used as an indicator to the user that the tool is engaged into a height adjustment system (as described herein). The safety lever assembly 80 may thus incorporate a human readable indicator.

The clamping cuff defines an opening through which the bearing flange is accessible and a door 40 at the opening and pivotably mounted to the clamping cuff 32 at a hinge 41. The hinge includes a biasing element 41a (FIG. 4), such as a torsion spring, leaf spring, spiral spring, serpentine spring or other suitable spring element configured to bias the door to an open position outward or away from the clamping cuff. In a further embodiment, the material of the hinge 41 may be adapted to form the biasing element. In yet another embodiment, an electric or electronic component, such as a transistor, may be used to form the biasing element. An actuator 42 is provided that controls the position of the door 40 and controls both the height adjustment and locking features of the tool support 30, as described below.

Figure 5:
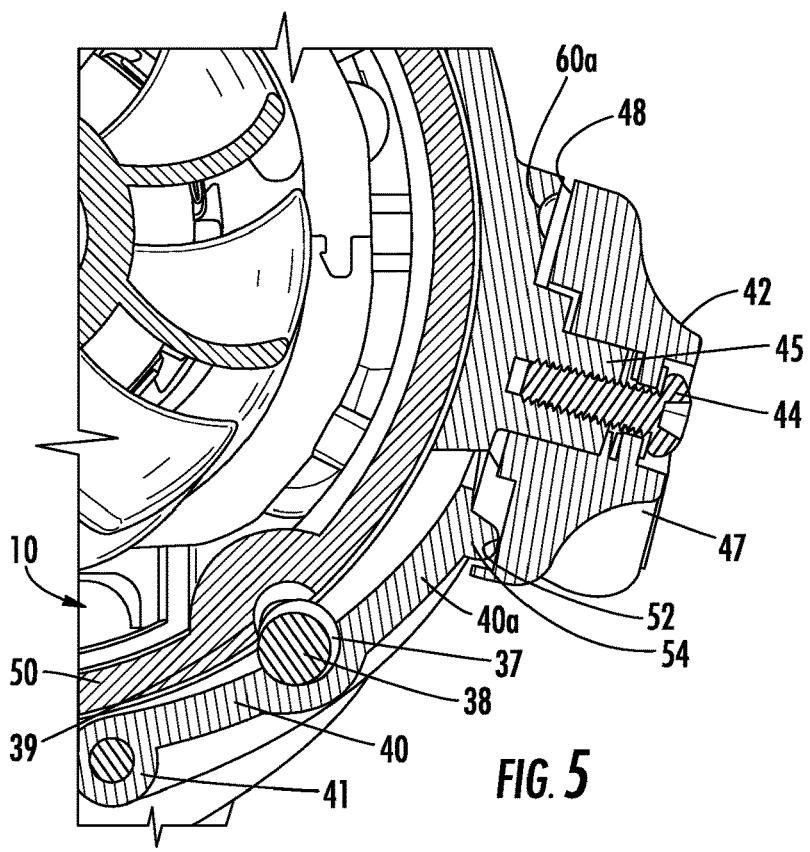
FIG. 5 is a bottom cross-sectional view of the tool support shown in FIG. 4.
Figure 6:
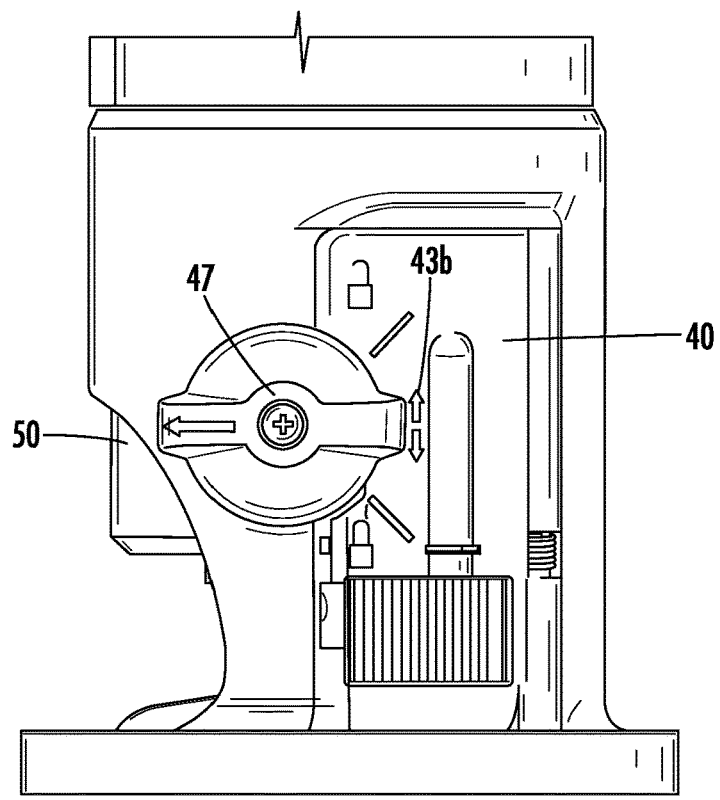
FIG. 6 is an enlarged side view of the tool support shown in FIG. 3 showing the actuation knob of the support in a second position according to one feature of the present disclosure.
Figure 7:
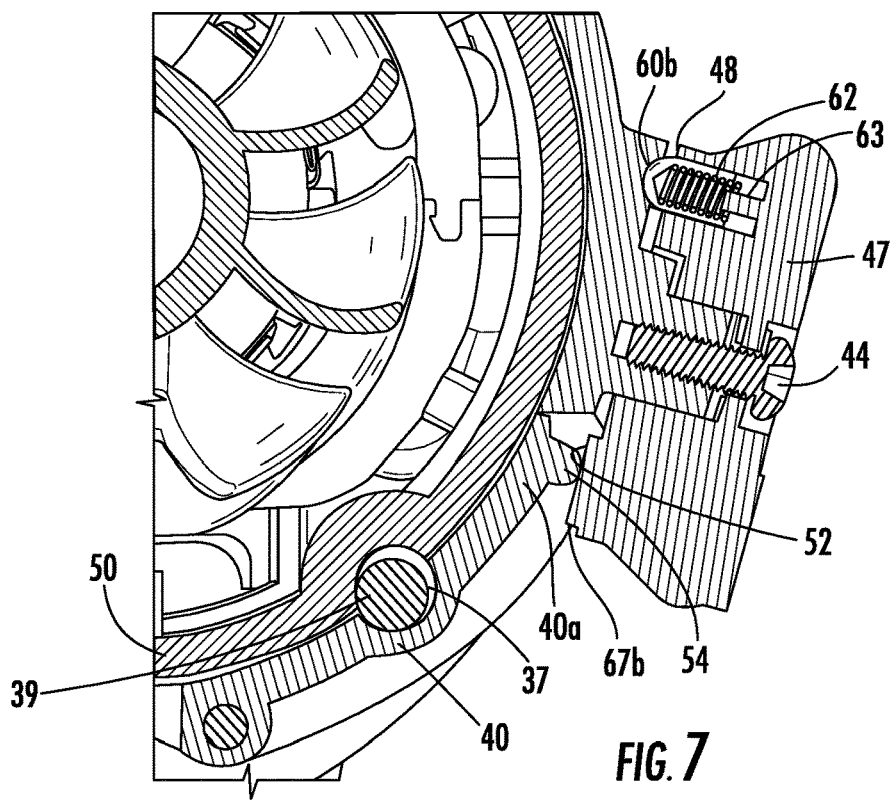
FIG. 7 is a bottom cross-sectional view of the tool support shown in FIG. 6.
Figure 8:
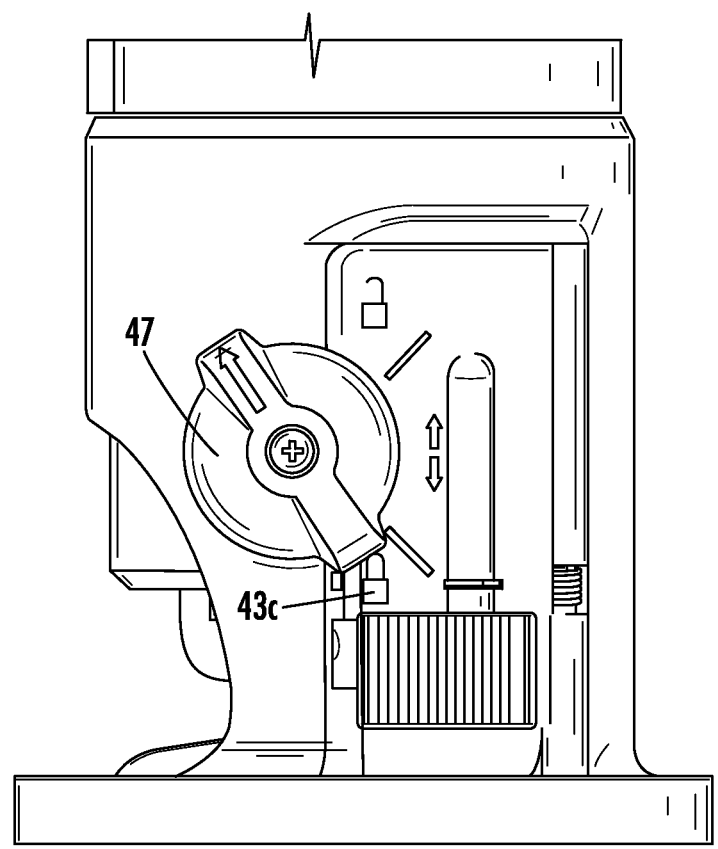
FIG. 8 is an enlarged side view of the tool support shown in FIG. 3 showing the actuation knob of the support in a third position according to one feature of the present disclosure.
Figure 9:
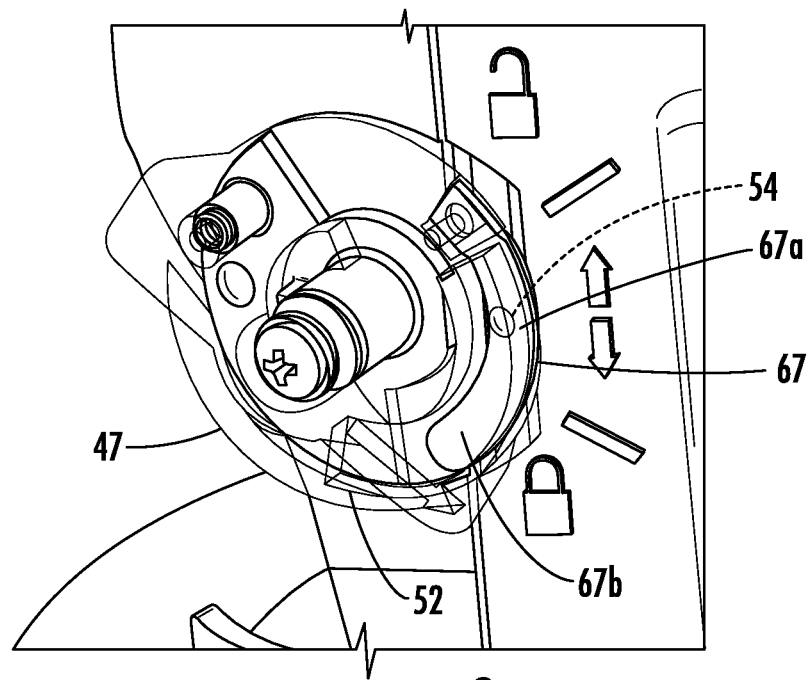
FIG. 9 is a bottom cross-sectional view of the tool support shown in FIG. 8.
Figure 10:
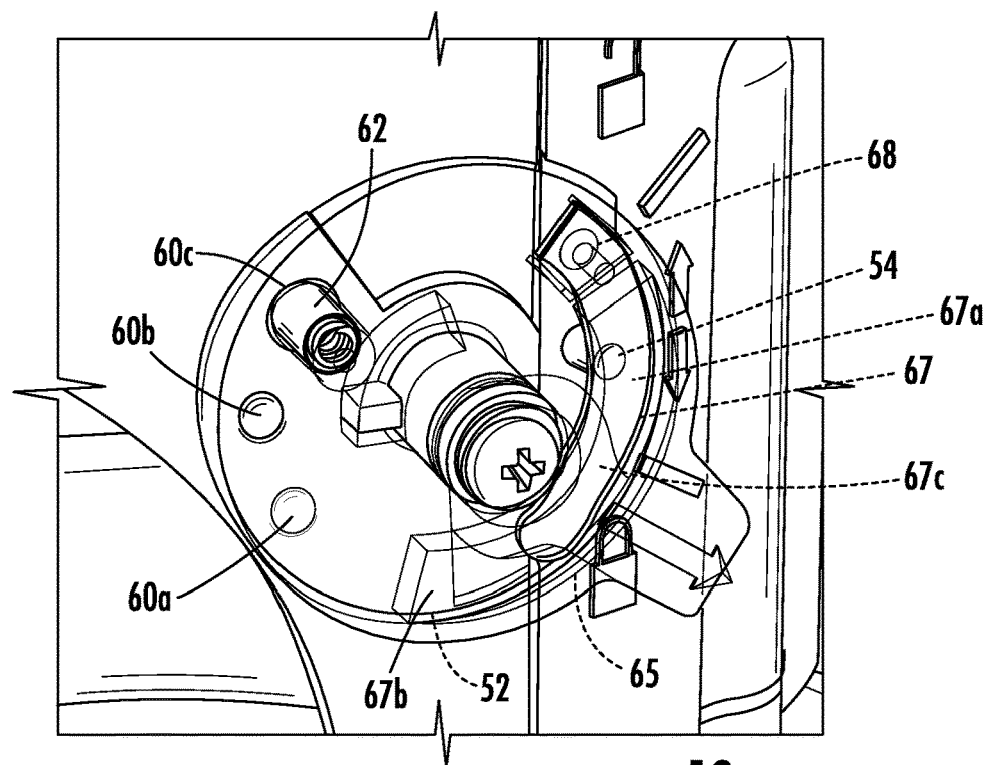
FIG. 10 is an enlarged partial phantom view of the actuator shown in FIGS. 4-9.

As shown in the detail views of FIGS. 4-11, the actuator 42 includes a knob 47 that is configured to be manually rotated. The knob 47 is rotatably attached to a mounting boss 45 on the clamping cuff 32 by way of a mounting screw 44. The knob is rotatable to three distinct positions defined by detent recesses 60a, 60b, 60c formed on the surface of the clamping cuff, as best seen in FIG. 10. The knob 47 may include a detent post or cap 62 that is biased by a spring 63 to project outward from the actuator surface 48 of the knob, as shown in FIG. 7. The cap 62 clicks into one of the detents 60a, 60b, 60c when the knob is appropriately aligned. The three positions correspond to a "macro" height adjustment position (FIGS. 4-5), a "micro" height adjustment position (FIGS. 6-7) and a locking position (FIGS. 8-9).

In the "macro" height adjustment position, the knob 47 is rotated to its uppermost position corresponding to the indicia 43a. The indicia 43a signifies that the clamping cuff 32 is "unlocked" relative to the bearing flange 50 of the power tool 10. In this position, the power tool 10 may be manually moved up and down relative to the tool support to effect a "macro" adjustment of the height of the power tool, and more pertinently to position the working end 11 near or in contact with the working surface beneath the base 31. The knob 47 includes an actuator surface 48 that faces the door 40 and more particularly the free or opening end 40a of the door. A detent projection 54 is defined at the opening end 40a of the door in a position beneath the actuator surface 48. The knob 47 defines a recess 52 in the actuator surface facing the door that is configured to receive the detent projection 54. When the recess 52 is aligned with the projection the biasing spring 41a biases the door 40 outward to the position shown in FIG. 5 so that the projection 54 seats within the recess 52.

Figure 11:
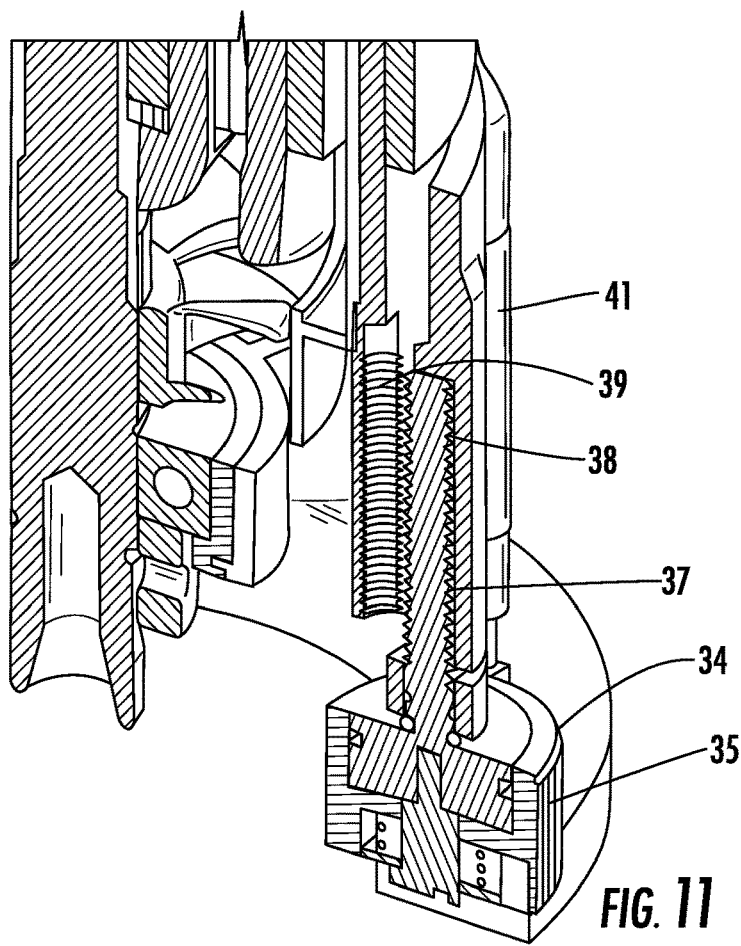
FIG. 11 is an enlarged partial cross-sectional view showing a thumb screw interface according to one aspect of the present disclosure.

The height adjustment assembly 34 includes a thumb wheel 35 and a threaded shaft 37. The thumb wheel and threaded shaft are carried by the door 40, and more specifically by a threaded half-bore 38 defined in the door, as shown in FIGS. 5 and 11. The threaded shaft 37 is supported in threaded engagement with the half-bore 38 in the door. The bearing flange 50 of the power tool 10 defines the mating threaded half bore 39 so that when the bearing flange and door are directly adjacent the two half-bores combine to form a continuous threaded bore for the height adjustment threaded shaft 37. Rotation of the thumb wheel 35 rotates the shaft 37 and the threaded engagement between the shaft and the threaded half-bore 39 in the bearing flange causes the flange 50 to move up and down, depending upon the direction of rotation of the thumb wheel. When the knob 47 is rotated to this position the post 62 clicks into the recess 60a and the user has an audible indication that the clamping cuff 32 is able to receive the power tool 10.

The tool support 30 may be provided with a guide pin 33 (FIG. 12) that operates as an alignment pin projecting inward from the inner surface 32a of the clamping cuff 32. The guide pin may interface with a corresponding vertical groove (not shown) defined in the outer surface of the power tool or bearing flange 50 to establish the proper circumferential position of the power tool. The guide pin 33 may be mounted, attached or fixed to the clamping cuff in a conventional manner, or may be monolithic component integrated into the inner surface 32a of the cuff 32.

Figure 4:
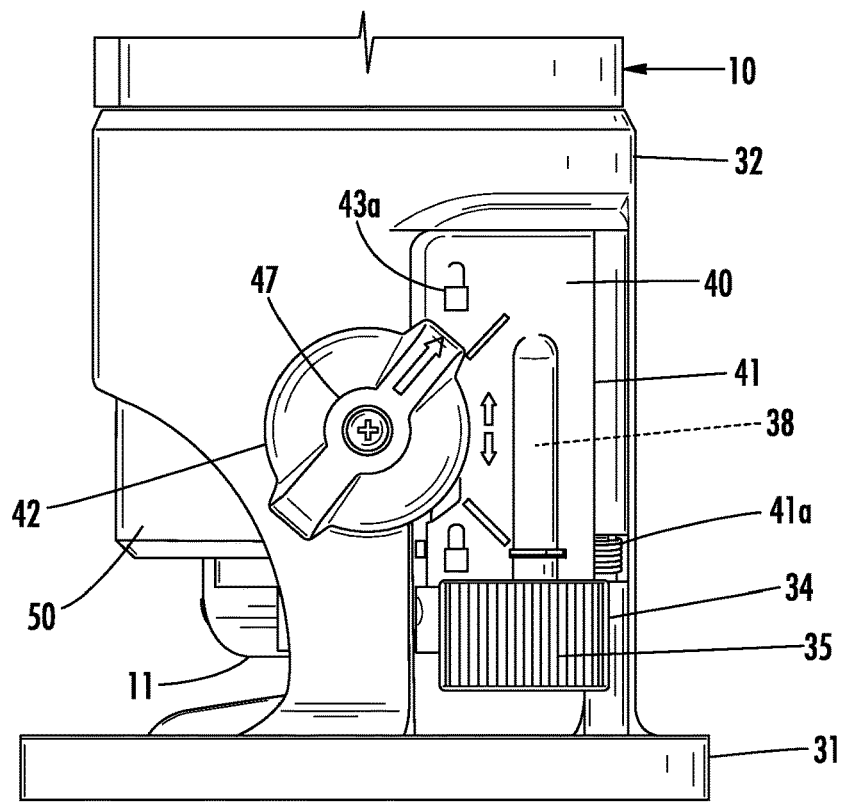
FIG. 4 is an enlarged side view of the tool support shown in FIG. 3 showing the actuation knob of the support in a first position according to one feature of the present disclosure.

The macro-adjustment position is provided when the knob 47 is aligned with indicia 43a, as shown in FIG. 4. When the knob 47 is rotated to this position the post 62 clicks into the recess 60a and the user has an audible indication that the clamping cuff 32 is able to receive the power tool 10. In this position, the door 40 is essentially open, meaning that it is offset from the bearing flange 50 so that the threaded half-bore 39 of the bearing flange is offset sufficiently from the threaded half-bore 38 of the door so that the threaded shaft 37 is unable to engage the threads of the bearing flange half-bore. In this position, the power tool can be moved freely up and down within the clamping cuff. It is, however, contemplated that the bearing flange and clamping cuff will form a close running fit so that there may be some slight resistance to the relative vertical movement.

After the power tool 10 has been positioned within the tool support 30 in a desired "macro" position, the knob 47 can be rotated to the position shown in FIGS. 6-7 corresponding to the "micro" height adjustment position. In this position, the cap 62 engages the middle recess 60b in the clamping cuff adjacent the indicia 43b signifying that the height of the power tool can be adjusted using the thumb wheel 35. As shown in FIG. 7, in this position the free end 40a of the door 40 is pushed inward toward the bearing flange 50 of the power tool. This movement may be caused by the detent projection 54 contacting a shallow detent recess 52 in the actuator surface 48 of the knob 47.

Figure 12:
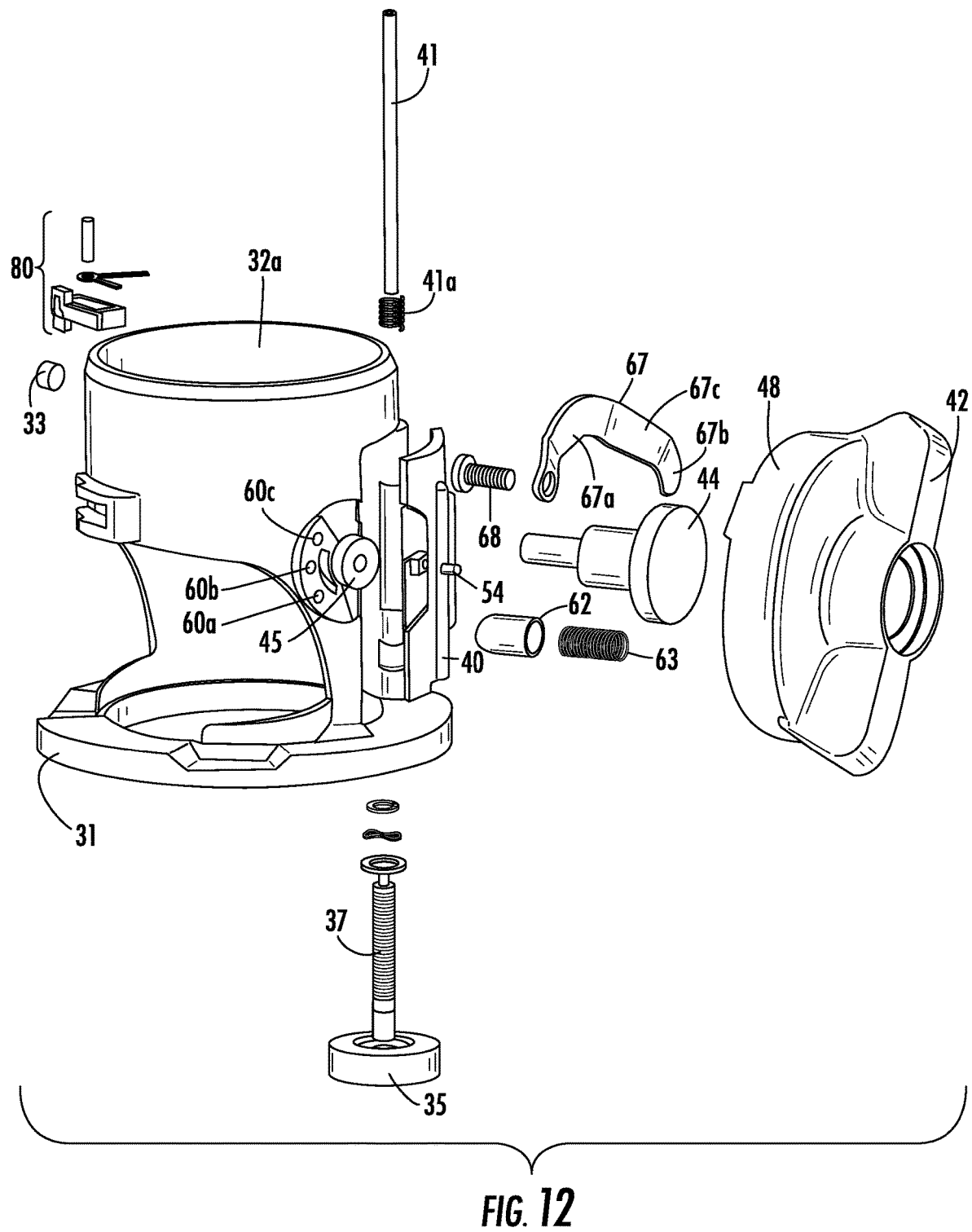
FIG. 12 is an exploded view of the tool support and actuator according to the present disclosure.
Figure 13:
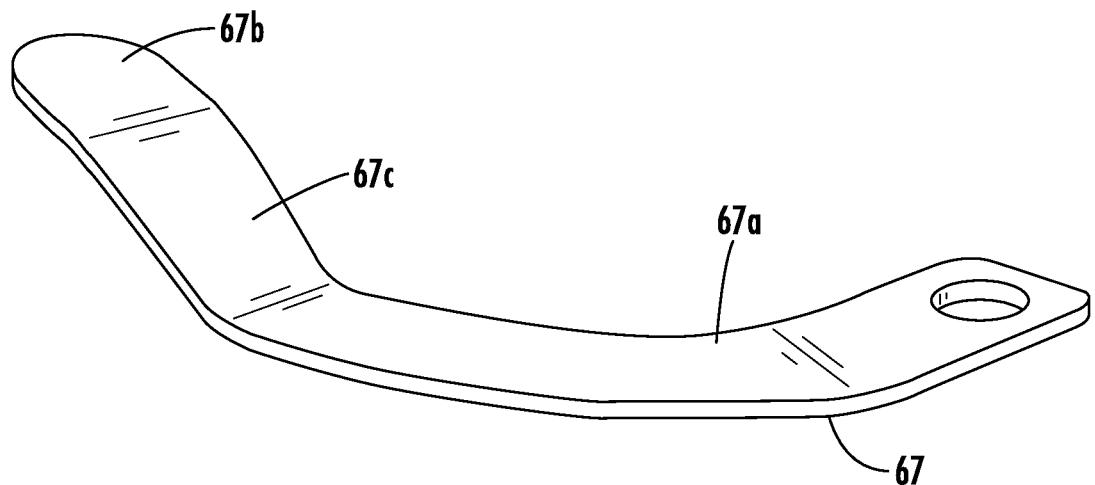
FIG. 13 is an enlarged perspective view of the leaf spring shown in FIG. 12.

The tool support includes a force generating component for applying a selectable force to the door to first move the door into a position immediately adjacent the bearing flange to form the threaded bore between the two half-bores 38, 39, and then to subsequently apply a greater force to clamp the threaded shaft 37 between the half-bores. In one embodiment, the force generating component includes a leaf spring 67 mounted to the actuator surface 48 of the knob, as best shown in FIGS. 9 and 10. The leaf spring 67 can be configured as shown in FIGS. 12-13 to include three portions 67a, 67b, 67c. The end of the leaf spring adjacent the portion 67a is fastened to the knob by a mounting screw 68 (FIG. 9) so that the leaf spring 67 bears against the free end 40a and detent projection 54 of the door 40 and so that the portions 67a, 67b, 67c are essentially cantilevered at the mounting screw. The portion 67b at the opposite end of the spring 67 contacts a channel 65 defined in the actuator surface 48 of the knob 47. As best seen in FIG. 13, leaf spring the portion 67c is a transition from the portion 67a to the portion 67b that bears against the channel 65 in the knob. This transition 67c provides the spring force for the leaf spring in a conventional manner. The portion 67b is also free to slide within the channel 65 as the spring is depressed by contact with the detent projection 54.

Returning to FIG. 7, in the micro-adjustment position the intermediate portion 67b of the leaf spring 67 bears against the detent projection 54 with sufficient force to push the door inward in directly adjacent relation with the bearing flange 50, and thus to push the threaded shaft 37 into threaded engagement with the other threaded half-bore 39 in the bearing flange 50. It can be noted that the cap 62 may be configured to engage the intermediate recess 60b (see FIG. 10) with an audible and/or tactile indication that the knob is in the "micro" height adjustment position.

In the macro-adjustment position shown in FIGS. 4-5, the knob 47 is rotated upward so that the free end of the leaf spring 67 adjacent the portion 67b is in contact with the detent projection 54 of the door 40. At this position, the spring force of the leaf spring 67 is at its lowest. The spring may be further configured so that in the macro-adjustment position the detent projection is aligned with the transition portion 67c. As the knob is rotated downward (or clockwise in the figures), the leaf spring contacts the detent projection at locations of the spring nearer and nearer to the fixed mounting at the anchored end of portion 67a.

Once the "micro" height adjustment is completed, the knob 47 can be rotated to the locking position depicted in FIGS. 8-10. The knob is rotated to its lowermost position adjacent the indicia 43c signifying that the clamping cuff 32 is locked onto the bearing flange 50 and tool 10. In this position, the actuator surface 48 may be configured to push against the detent projection 54 with sufficient force to press the door into the threaded shaft 37, which thus presses the shaft into the other half-bore 39 with sufficient force to prevent or restrict rotation of the threaded shaft within the bore. Alternatively, the leaf spring 67 is rotated with the portion 67a in contact with the detent projection 54. In the locking position, the full spring force of the leaf spring 67 bears against the detent projection to push the free end 40a of the door inward. The inside surface of the free end 40a of the door 40 may be configured to contact the outer surface of the bearing flange 50 when the door is pushed inward by the leaf spring bearing against the detent projection. In another embodiment, the inner surface of the door 40 may be offset outwardly from the surface of the bearing flange so that the full force of the biasing element 67 is transferred to the threads to lock the threads and thumbwheel from further adjustment or rotation. It can again be noted that the cap 62 may be configured to engage the uppermost recess 60c (see FIG. 10) with an audible and/or tactile indication that the knob is in the locking adjustment position. It is contemplated that the force applied to lock the threaded shaft within the threaded half-bores need only be sufficient to hold the vertical position of the tool relative to the base. In other words, as long as the threads of the threaded shaft 37 are in engagement with the threads of both half-bores 38, 39, it is necessary for the threaded shaft to essentially unwind or counter-rotate to allow the power tool to drop due to gravity. The inherent friction between the threads will help deter such movement. This inherent friction can be increased by squeezing the threaded shaft between the half-bores by some greater amount than is necessary to form the threaded bore. Thus, while the force applied in the locking position may not be sufficient to prevent manual movement of the threaded shaft by the thumbwheel, it can be enough to prevent counter-rotation of the threaded shaft due to the force of gravity on the power tool, which in turn prevents vertical movement of the power tool from the selected height.

Figure 14:
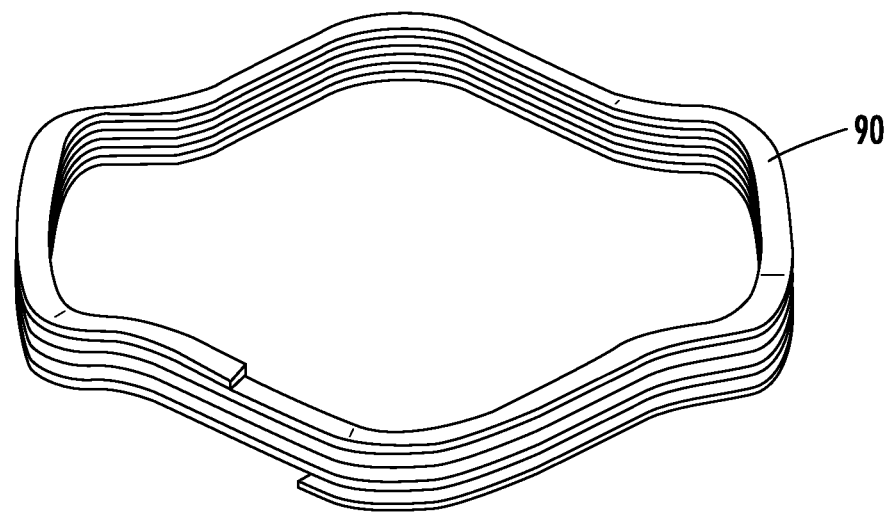
FIG. 14 is perspective view of a wave spring stack for use with the tool support.

In one alternative, the leaf spring may be replaced with a wave spring or a nested wave spring configuration 90 as shown in FIG. 14. The use of a wave spring arrangement eliminates the potential stress that may arise in the leaf spring at the fixed mounting location. The use of a nested wave spring configuration 90 provides a high clamping force with much reduced stress load on the spring than for the cantilevered leaf spring. The wave spring arrangement can incorporate multiple wave springs nested together, as depicted in FIG. 14. This facilitates production of each wave spring which may have a small thickness, and facilitates calibration of the spring force based on the number of layers nested in the wave spring arrangement.

Figure 15A:
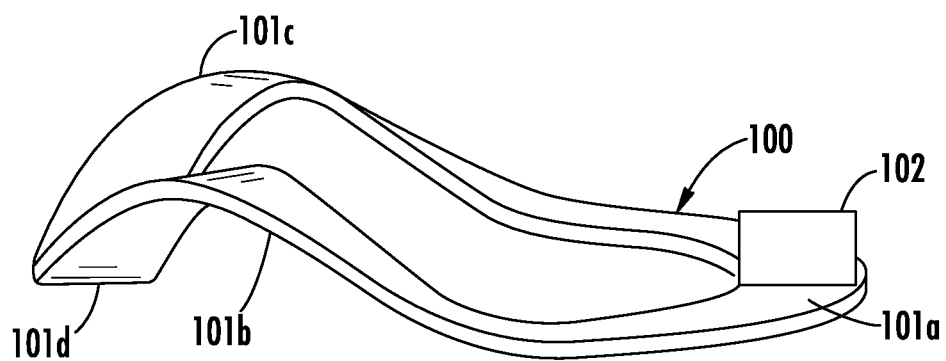
FIGS. 15a-c are side and top perspective views of a wave spring arrangement according to one aspect of the present disclosure.
Figure 15B:
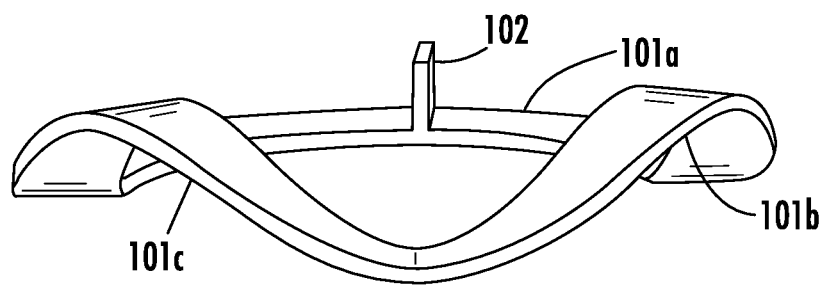
Figure 15C:
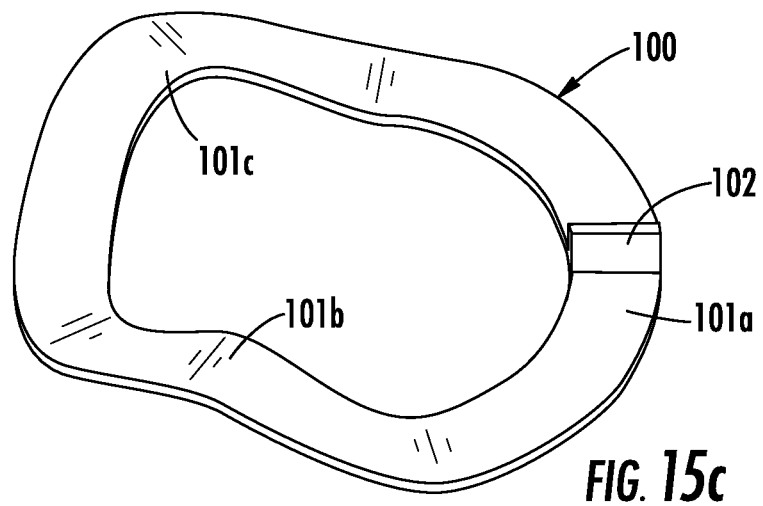

The wave spring configuration can be modified as illustrated in FIGS. 15a-c. In particular, the wave spring configuration 100 can include a generally flat base portion 101a subtending about half the circumference of the wave spring configuration, and two wave portions 101b, 101c occupying the other half of the circumference. In one embodiment the waves 101b, 101c are spaced apart 110° from each other. The base portion 101a is non-functional, meaning that it does not generate a spring force between the knob 47 and door 40. The base portion 101a may incorporate an anti-rotation tab 102 that projects upward into a complementary groove in the knob to prevent the spring from rotating relative to the knob. The wave spring configuration 100 may include a single spring or two or more nested wave springs. As a further alternative, the wave spring arrangement is not fully circumferential but instead may be modified to truncate or remove the base portion 101a.

Figure 16:
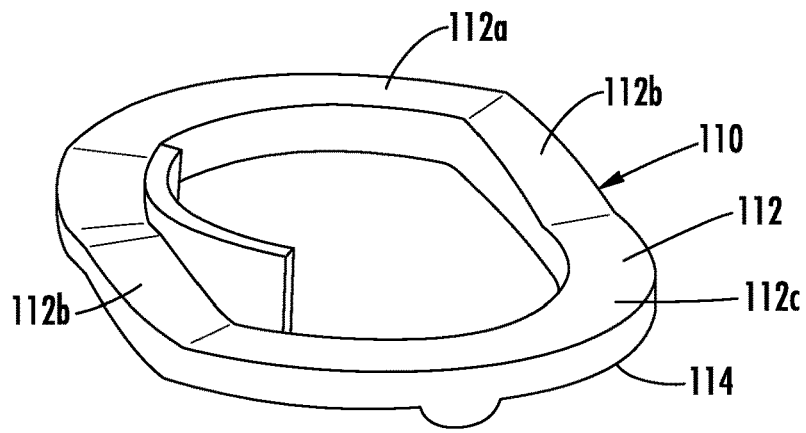
FIG. 16 is a perspective view of a cam plate according to a further aspect of the present disclosure.
Figure 17A:
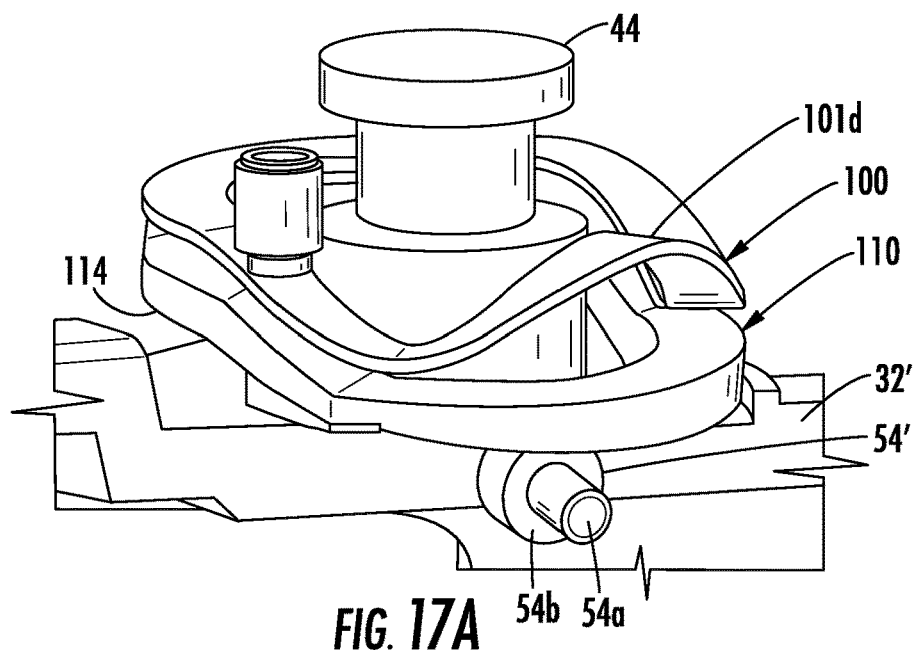
FIGS. 17a-d show the wave spring arrangement and cam plate of FIGS. 15-16 incorporated into a tool support according to the present disclosure.

In order to accommodate this modified wave spring 100, the tool support is modified to incorporate a cam plate 110, as illustrated in FIG. 16 between the wave spring configuration 100 and knob 47 on one hand, and the door 40 and clamping cuff 32 on the other. The cam plate 110 includes an upper surface 112 against which the wave spring configuration 100 bears at different stages of rotation of the knob 47. The cam plate includes a lower cam surface 114 that contacts the door 40 so that the wave spring and cam plate can operate as a force generating component to apply a force to the door as discussed above. In one embodiment, the door 40 is modified to replace the detent projection 54 with a roller arrangement 54', as shown in FIG. 17a. An axle 54a is mounted within the edge of the door and a roller 54b is mounted for rotation on or rotation with the axle. The use of the roller arrangement 54' in lieu of the detent projection 54 reduces the friction between the door and the knob as the knob is rotated between the three positions.

Figure 17B:
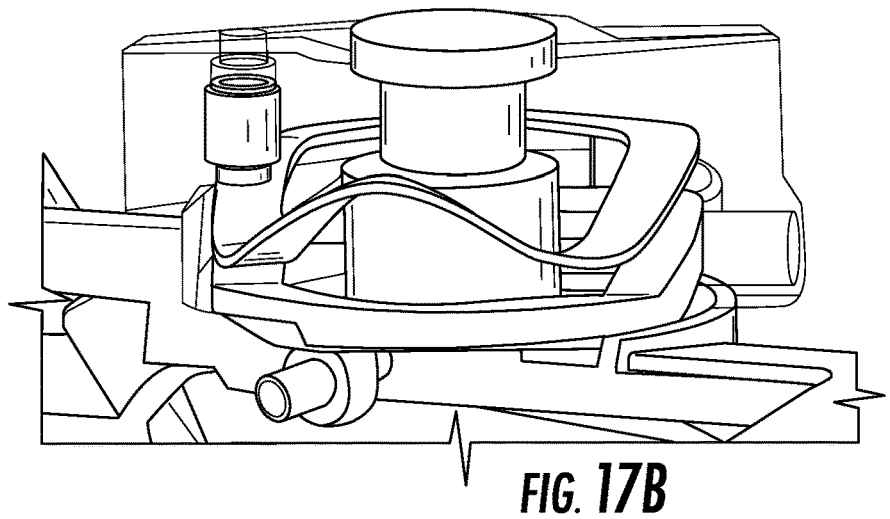

The upper surface 112 of the cam plate is configured to accommodate the wave spring arrangement 100. In particular, the cam plate 110 includes a generally flat portion 112a to receive the flat base portion 101a of the spring arrangement. The upper surface includes opposite transition portion 112b that lead to a wave engaging portion 112c which receives the wave portions 101b, 101c of the spring arrangement. The node 101d between the two wave portions 101b, 101c contacts the body of the knob 47, as depicted in FIG. 17b.

Figure 17C:
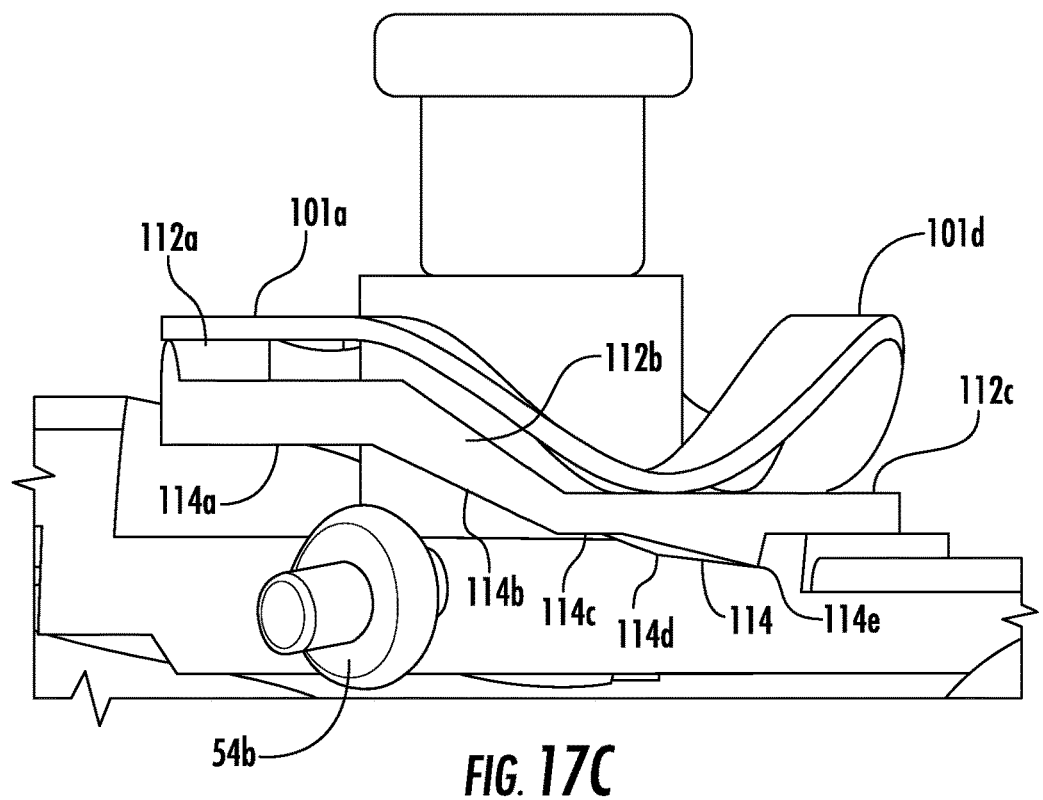
Figure 17D:
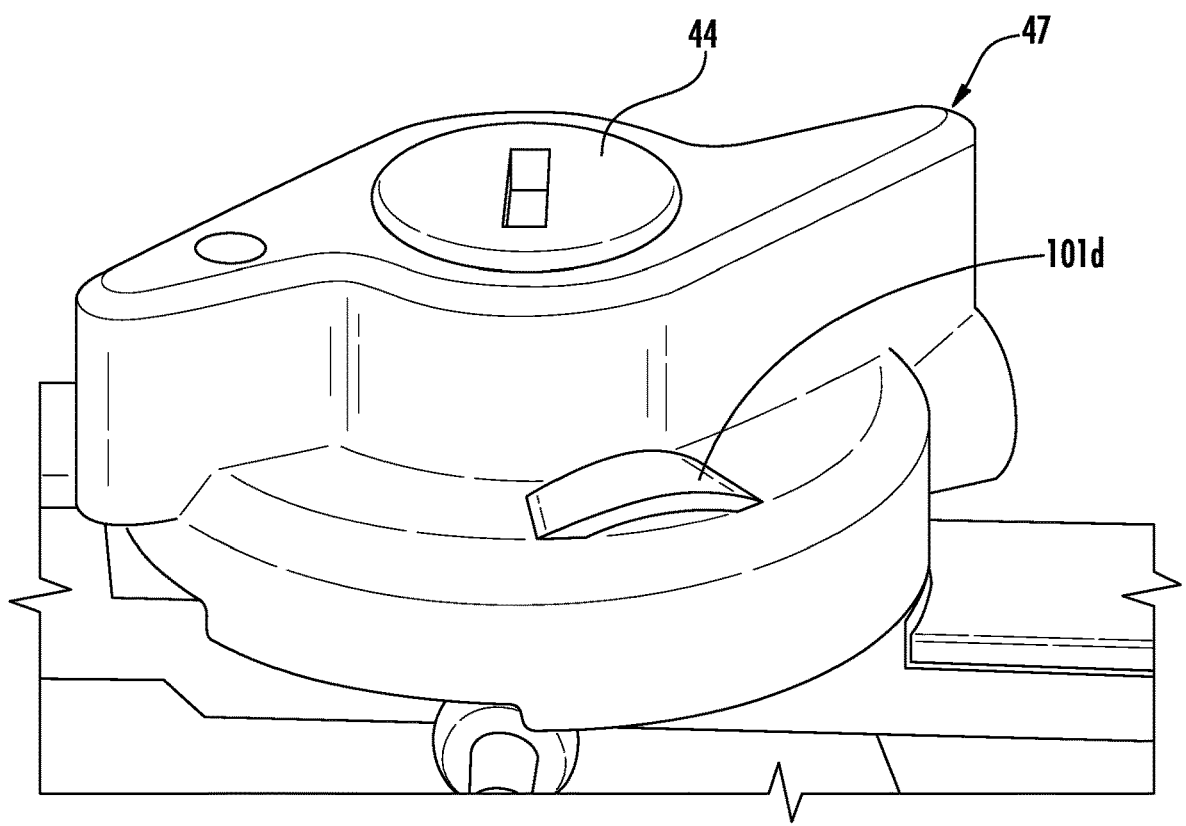

The cam surface 114 of the cam plate 110 is configured so that contact with the roller 54b transmits spring force from the spring arrangement 100 to the roller arrangement 54' and ultimately to the door 47 in a manner similar to the leaf spring 67 described above. The spring force is variable depending on the portion of the cam surface 114 that is in contact with the roller 54b. As shown in FIG. 17c, the cam surface 114 includes five zones. The first zone 114a is always offset from the roller 54b so that no spring force is exerted on the roller arrangement. The first zone corresponds to the macro-adjustment position, signified by the indicia 43a when the knob is rotated to its uppermost position, as shown in FIG. 4. As the knob is rotated, the second zone 114b contacts the roller which gradually pushes the cam plate 110 upward against the spring arrangement 100. The third zone 114c corresponds to the micro-adjustment position signified by the indicia 43b as shown in FIG. 6. A fourth zone 114d gradually increases the spring force as the cam plate is pushed further upward. When the knob is rotated to its lowermost position corresponding to the locking position 43c shown in FIG. 8 the roller 54b is in contact with the fifth zone 114e. In this zone the cam plate is pushed upward into the knob to its fullest extent and the spring arrangement 100 is compressed to its limit within the knob. In this zone the spring force exerted against the roller arrangement 54' and door 40 is the greatest in order to lock the components as described above.

The base 31 and clamping cuff 32 may be integrally formed, such as by casting from a hard durable material. The door 40 may be formed of the same material as the clamping cuff. The door may be mounted to the clamping cuff by the hinge 41 which may be in the form of a typical pivot rod and sleeve arrangement. Other hinge arrangements are contemplated, such as a "living hinge" in which the door is integrally formed with the clamping cuff. The biasing element 41a may be a torsion spring, as described above, or another element capable of biasing the free end 40a of the door outward and away from the clamping cuff.

Figure 18A:
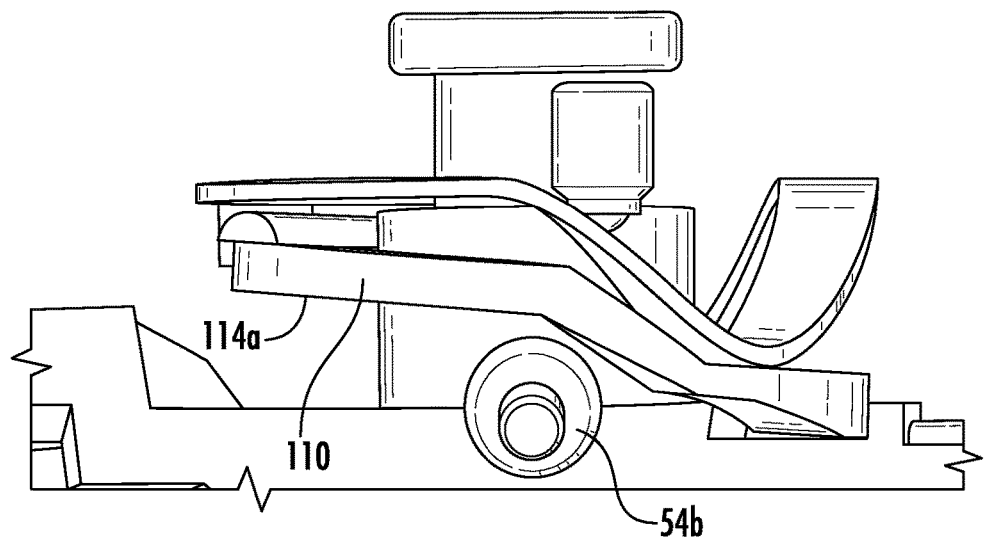
FIGS. 18a, 18b show the wave spring arrangement and cam plate in a first position.
Figure 18B:
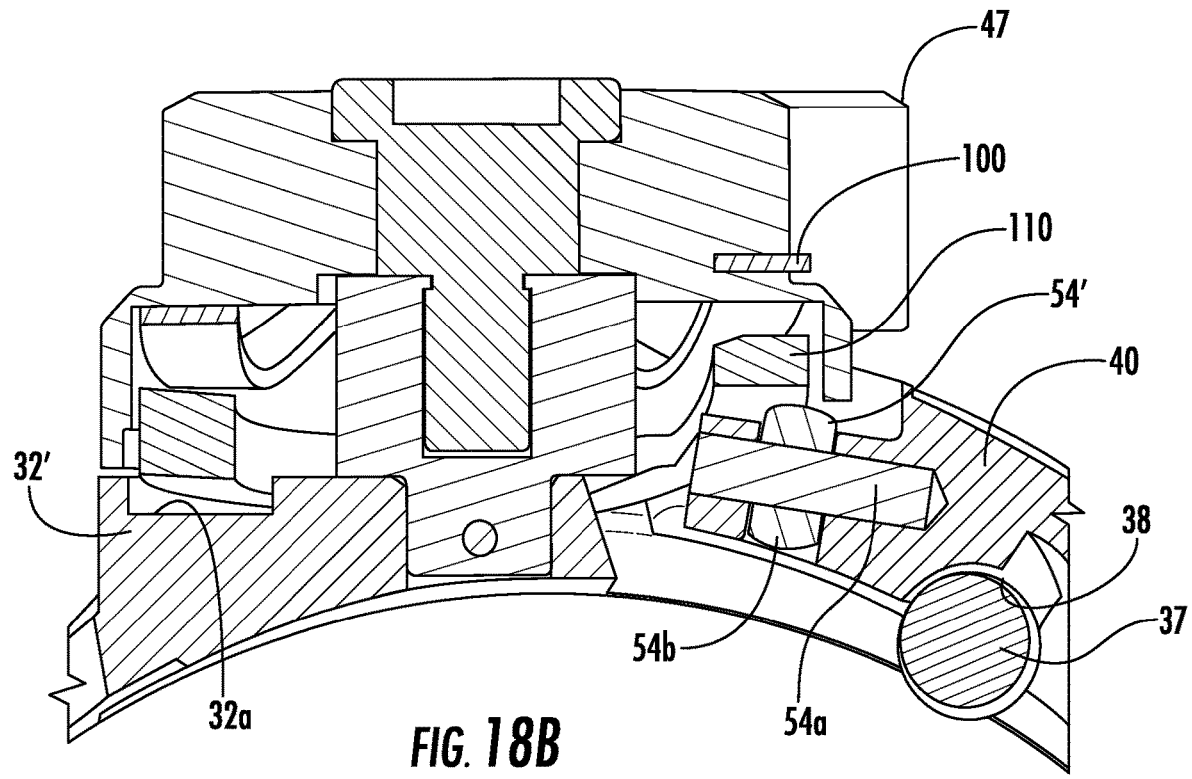
Figure 19A:
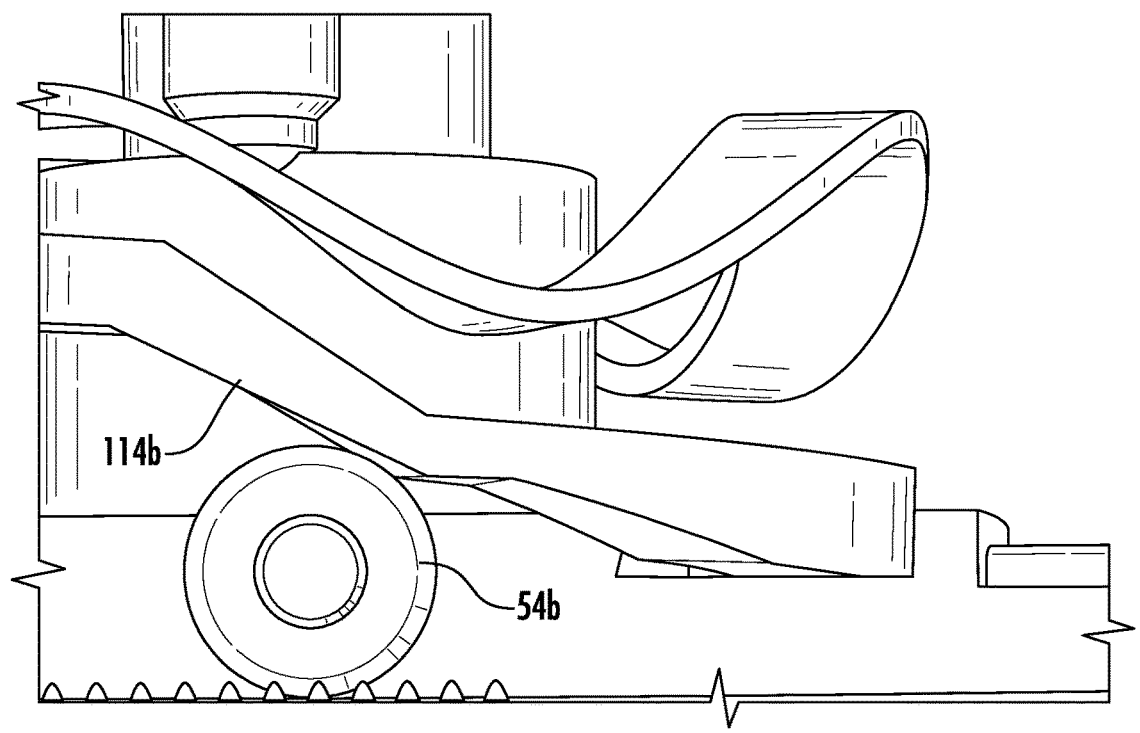
FIGS. 19a, 19b show the wave spring arrangement and cam plate in a second position.
Figure 19B:
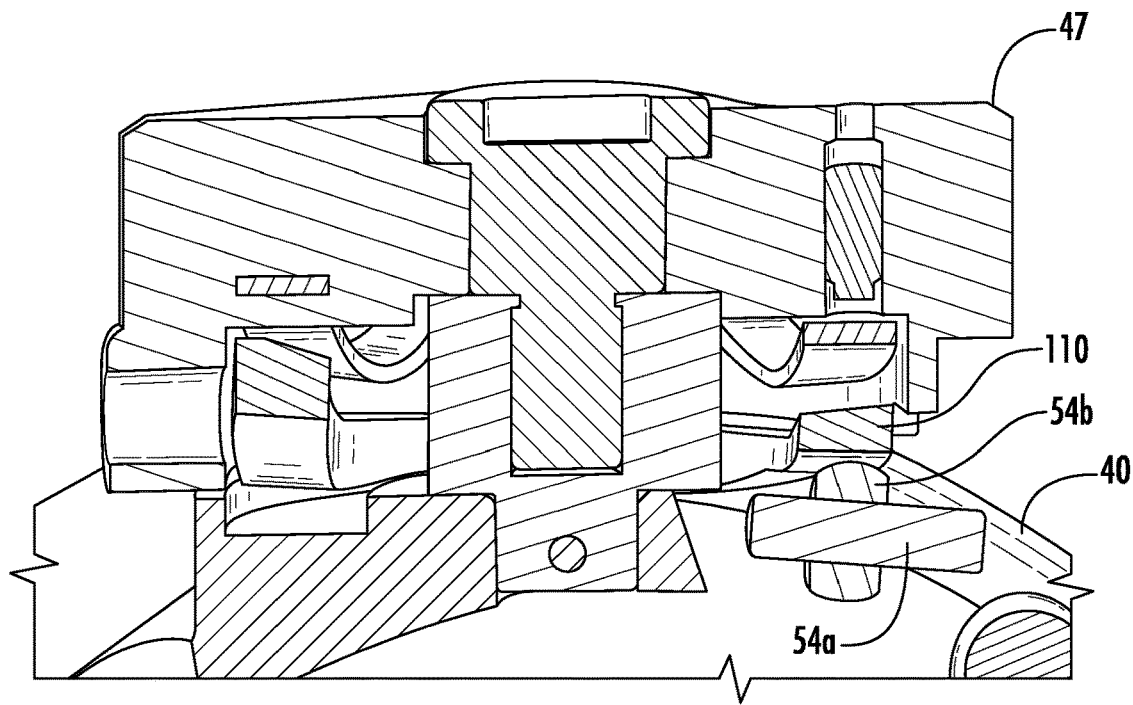

The 0 degree position corresponding to the macro-adjustment position indicator 43a is shown in FIGS. 18a, 18b. In this position the roller 54b is offset from the zone 114a of the plate 110 so no spring force is exerted on the roller arrangement 54' or the door 40. As shown in FIG. 18b, the clamping cuff 32' defines a circumferential channel 32a for receiving the cam plate 110 as the wave spring arrangement 100 pushes against the knob 47 and cam plate 110. FIGS. 19a, 19b illustrate the initial contact between the roller 54b and the cam surface 114, in particular at the zone 114b. In this position the cam plate 110 has been moved upwards into the knob just in contact with the wave spring arrangement 100. In one embodiment this contact occurs after about 20 degrees of rotation of the knob and before the knob is at the micro-adjustment position 43b.

Figure 20A:
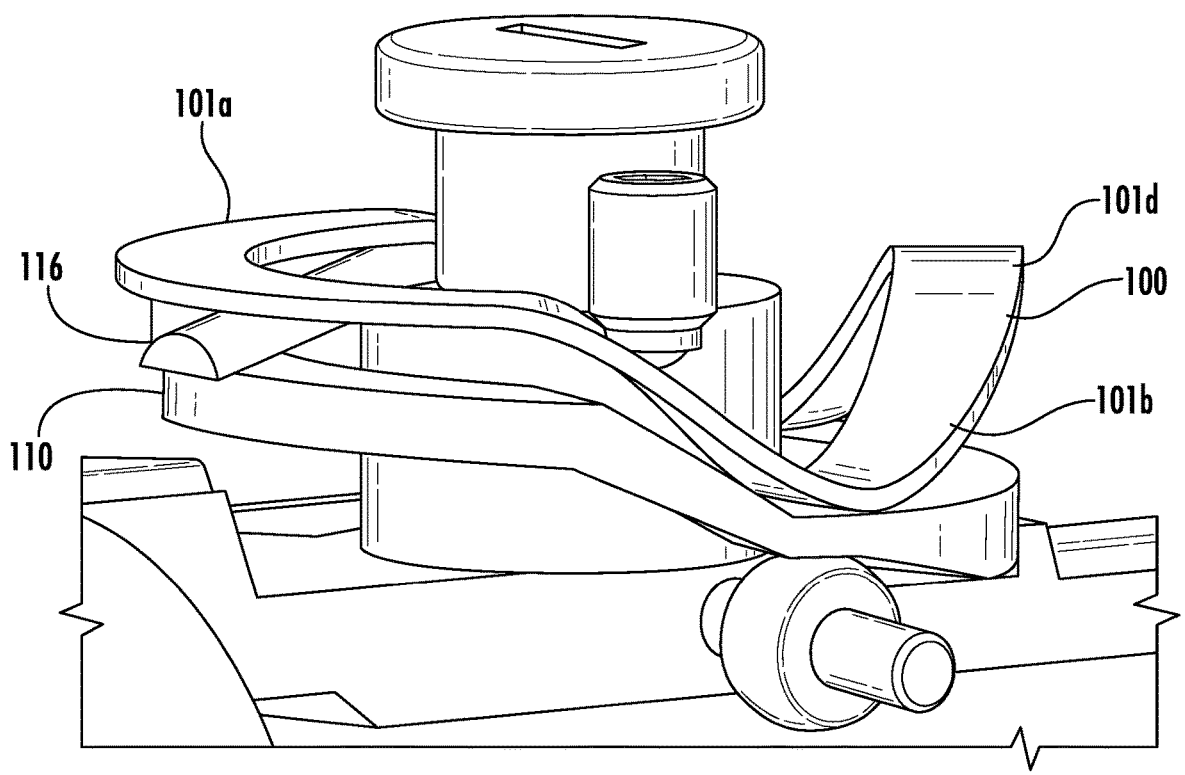
FIGS. 20a, 20b show the wave spring arrangement and cam plate in a third position.
Figure 20B:
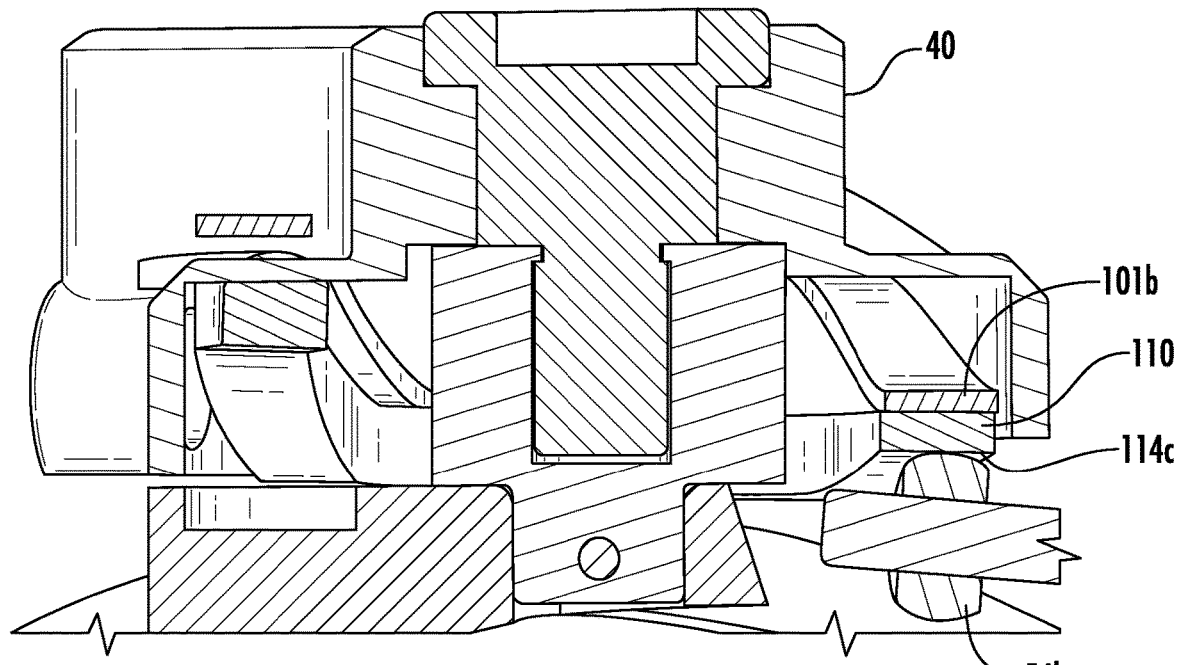

FIGS. 20a, 20b show the orientation of the roller, cam plate and wave spring arrangement when the knob is rotated to the micro-adjustment position 43b. In particular, the roller 54b contacts the zone 114c of the cam plate 110 which pushes the cam plate further upward into the knob, thereby compressing the wave portions 101b, 101c between the cam plate and the knob. This compression results in a spring force against the roller arrangement 54' and door 40 to bring the threaded bore halves 38, 39 together about the threaded shaft 37 to thereby permit the fine height adjustment for the tool. In one embodiment this orientation occurs at about 40 degrees of rotation of the knob 47.

Figure 21A:
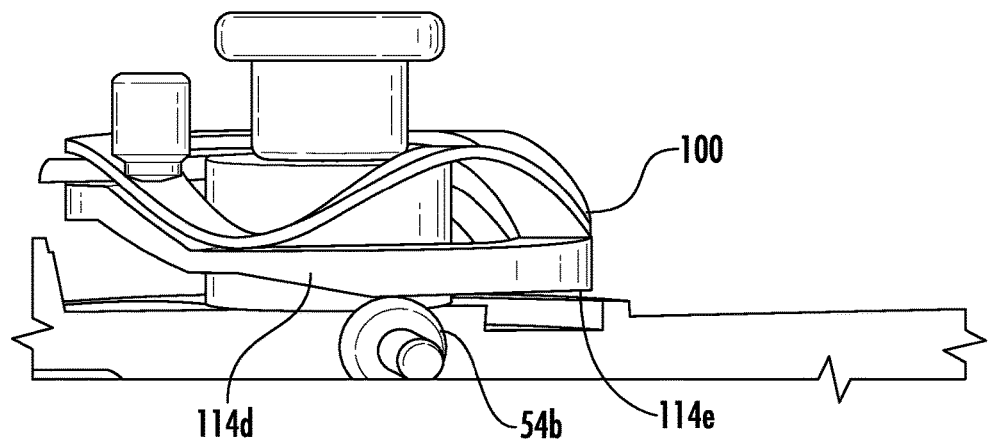
FIGS. 21a, 21b show the wave spring arrangement and cam plate in a fourth position.
Figure 21B:
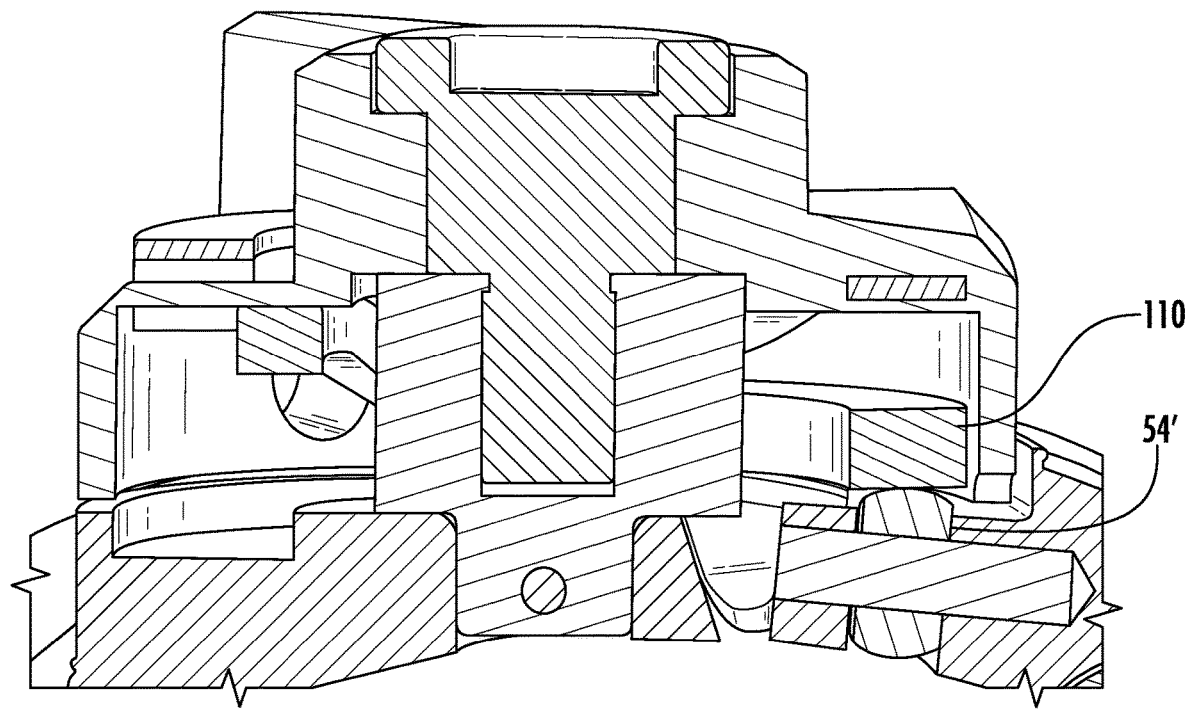

FIGS. 21a, 21b show the roller 54b contacting the final zone 114e of the cam plate 110 when the knob has been rotated to the locking position 43c. As the knob is rotated from the micro-adjustment position to the locking position, the roller 54b moves along the transition zone 114d so that the spring force gradually increases. In the position shown in FIGS. 21a, 21b, the wave spring arrangement 100 is at its greatest compression between the cam plate and knob so that the spring force is thus at its greatest to lock the threaded shaft 37 within the bore halves and thereby lock the vertical position of the tool. In one embodiment this orientation occurs at about 80 degrees of rotation of the knob 47.

In one embodiment, the wave spring arrangement 100 can have a free uncompressed height in the macro-adjustment position (FIGS. 18a, 18b) of about 0.300 in. (7.62 mm). In the micro-adjustment position (FIGS. 20a, 20b) the wave spring arrangement can be compressed to a height of about 0.269 in. (6.832 mm) for a spring force of about 10 lbf. In the locking position (FIGS. 21a, 21b) the spring is further compressed to a height of about 0.216 in. (5.48 mm) for a clamping spring force of about 26 lbf.

In one aspect, the cam plate 110 may be configured to translate uniformly upward as the knob 47 is rotated and the roller 54b bears against the successive zones 114b-114e. Alternatively, the cam plate 110 may include a fulcrum 116, best shown in FIG. 20a, about which the cam plate pivots. The fulcrum 116 is generally opposite the transition zone 114d but it is understood that the cam plate 110 will pivot upward about the fulcrum as the roller contacts the transition zone 114b and continues through the remaining zones 114c-114e. The cam plate 110 may be pivotably fastened to the knob at the fulcrum 116, such as by a pivot pin passing through the knob and fulcrum.

Figure 22A:
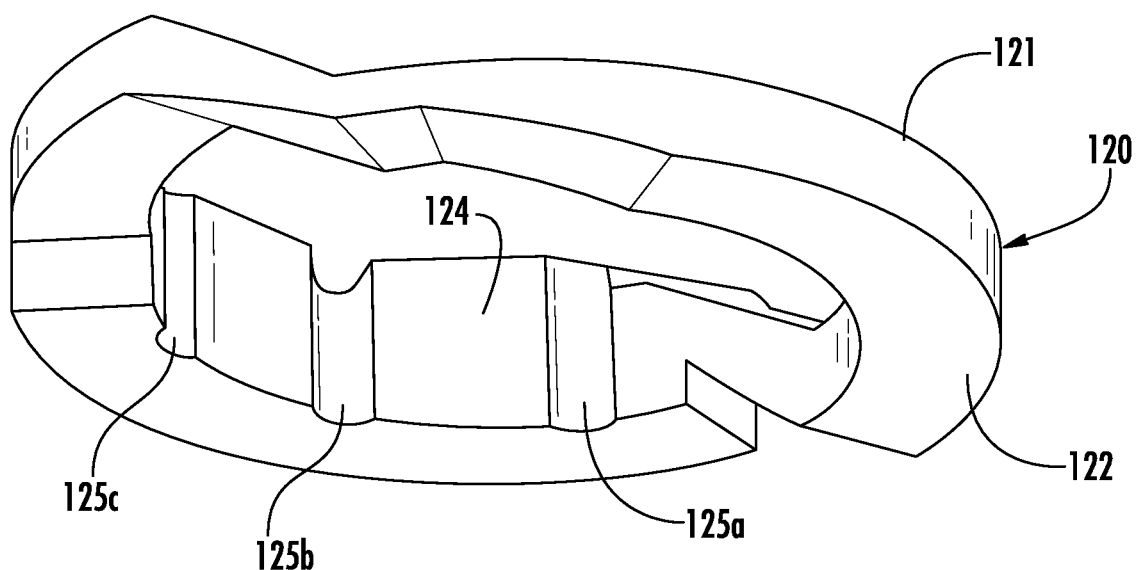
FIGS. 22a, 22b show perspective and top views of a modified cam plate.
Figure 22B:
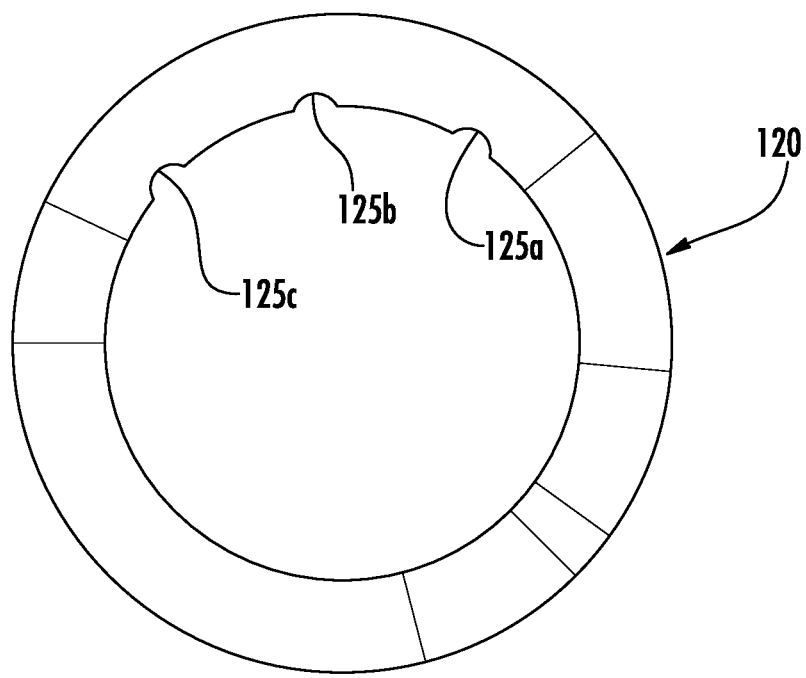
Figure 23:
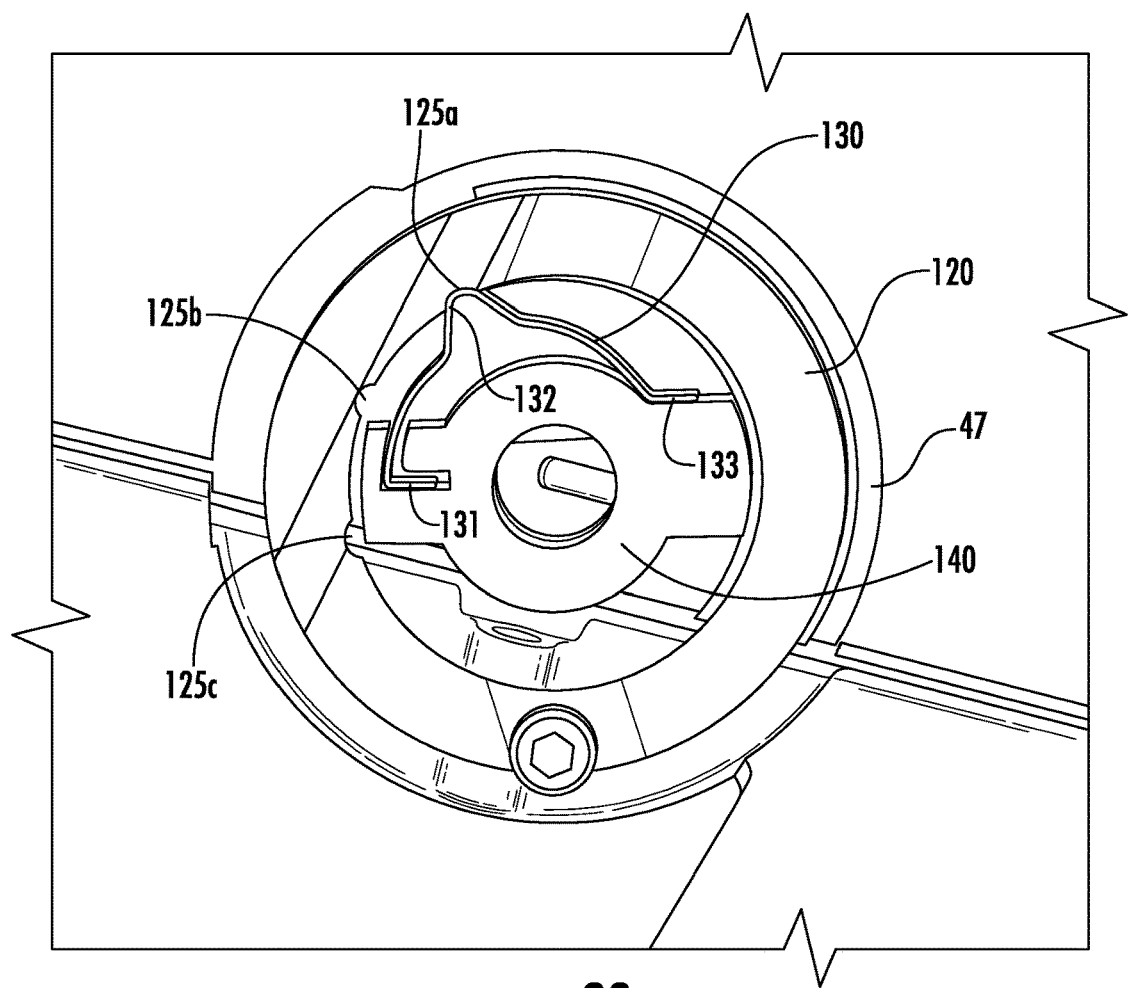
FIG. 23 is a top view of the modified cam plate of FIG. 22 with a detent spring according to a further aspect of the present disclosure.

In the embodiment of FIGS. 4-10, the knob 47 includes a spring-biased cap 62 that engages one of three recesses 60a, 60b, 60c corresponding to the three functional positions 43a, 43b, 43c of the knob. In the embodiment of FIGS. 15-17 incorporating the wave spring arrangement and cam plate, the detent positioning feature for the knob can be incorporated into the cam plate. Thus, as shown in FIGS. 22a, 22b, a cam plate 120 can be modified from the cam plate 110 to incorporate the detent feature. The cam plate 120 can include an upper surface 121 and cam surface 122 that can be the same as the upper and cam surfaces of the prior cam plate 110. However, the cam plate 120 includes three detent channels 125*a*, 125*b*, 125*c* defined in the inner circumferential surface 124 of the cam plate. These three channels are configured to receive a detent spring, such as the detent spring 130 shown in FIG. 23. The detent spring 130 includes a base 131 that is fastened to a hub 140 defined on the clamping cuff 32. The knob is pivotably mounted on the hub 140 and the cam plate 120 is connected to the knob to rotate with the knob as described above. The detent spring 130 is thus held in a fixed position relative to the knob, cam plate and detent channels 125*a*, 125*b*, 125*c*. The detent spring 130 further includes a detent portion 132 that is configured to seat within any of the channels, such as the channel 125*a* depicted in FIG. 23. The free end 133 of the spring rides along the hub 140 so that the spring can deflect as needed to release from a channel when the knob is rotated relative to the hub and detent spring.

Figure 24:
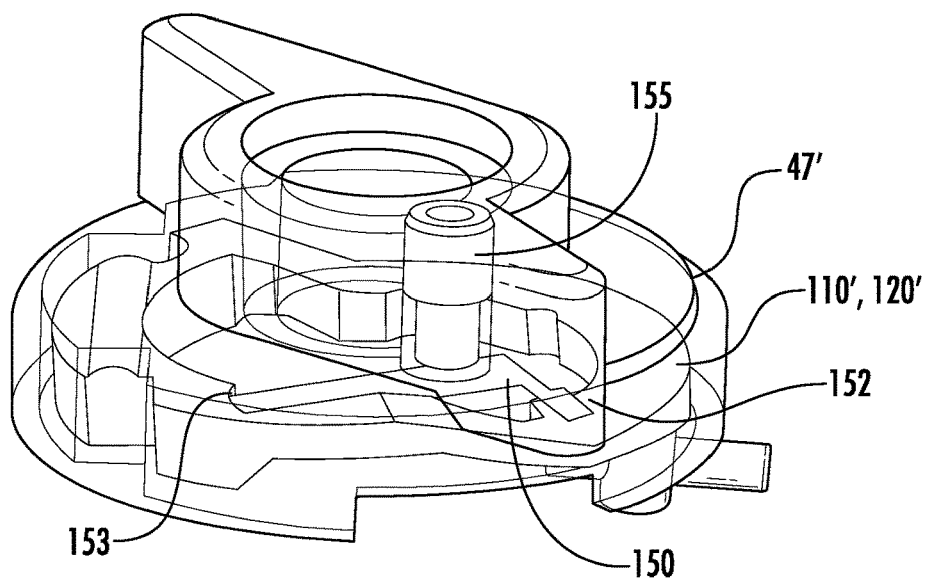
FIG. 24 is a perspective view of an adjustable pre-bias feature according to the present disclosure.

In a further modification, an adjustable pre-load may be applied to the cam plate in addition to the spring force applied to the plate by the wave spring arrangement 100. Thus, as shown in FIG. 24 a cantilevered spring 150 may be mounted on a cam plate 110', 120' that has been modified to included support steps 152, 153 for supporting the opposite ends of the cantilevered spring 150. A set screw 155 supported in a modified knob 47' bears against the cantilevered spring 150 to push down on the spring. This downward force is translated to the cam plate 110', 120' through the support steps 152, 153 to apply a pre-load. The amount of pre-load can be adjusted by threading the set screw 155 into or out of the knob.

Figure 25A:
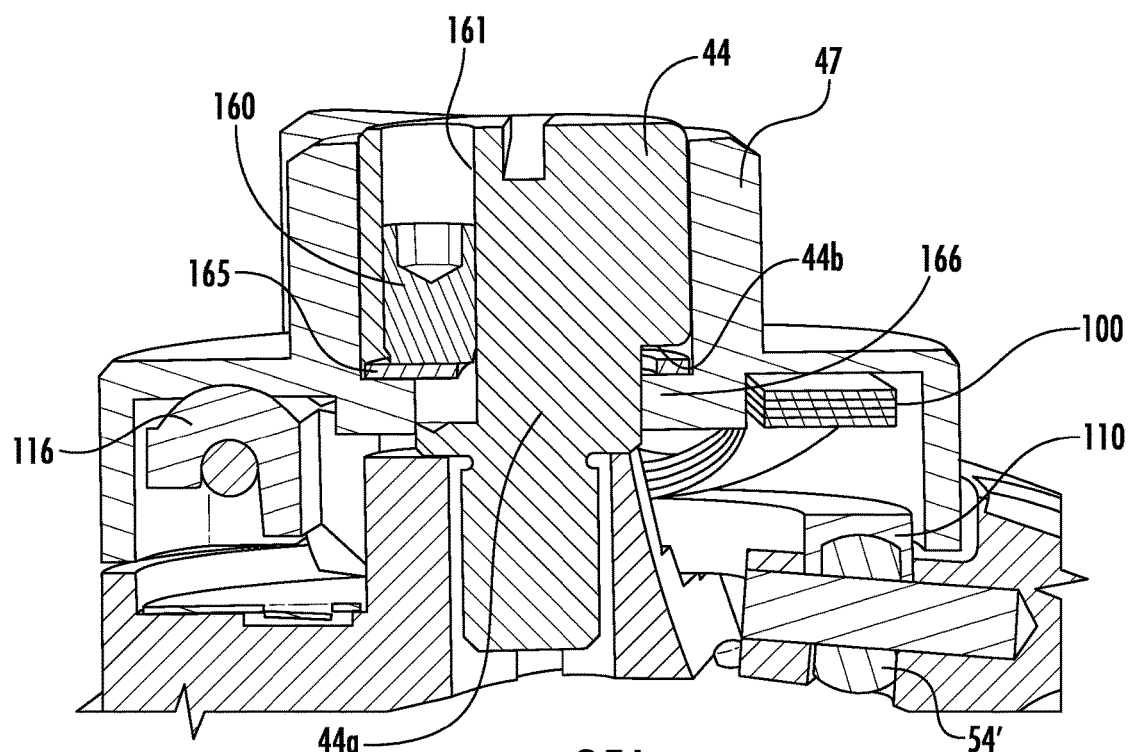
FIGS. 25a, 25b are cross-sectional and perspective views of an adjustable pre-bias feature according to a further aspect of the present disclosure.
Figure 25B:
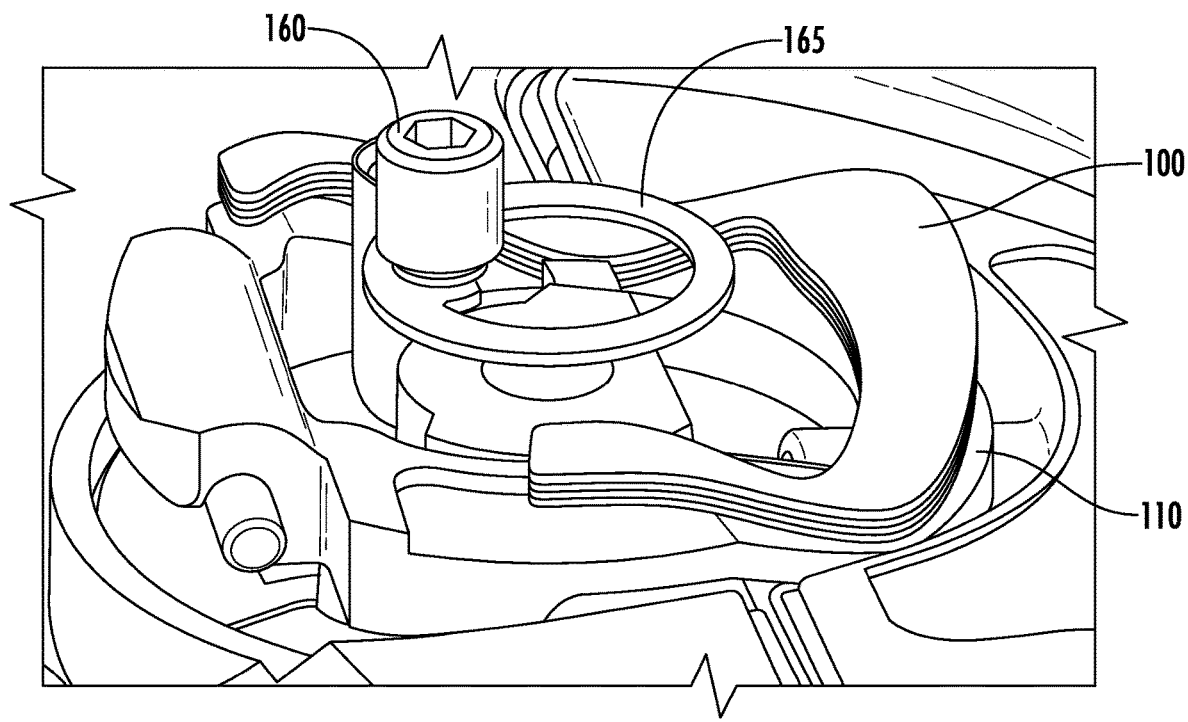

FIGS. 25*a*, 25*b* show a further adjustable pre-load component incorporating a set screw 160 threaded into a bore 161 defined in the mounting screw 44 used to fasten the knob 47 to the housing. The set screw 160 bears against a washer 165 disposed concentrically about the hub 44*a* of the mounting screw and positioned between a shoulder 44*b* of the mounting screw 44 and a shoulder 166 of the knob. As the set screw 160 is threaded into the bore 161 in the mounting screw it bears against the shoulder 166 of the knob, which in turn is resisted by the wave spring arrangement 100. The set screw 160 can thus be used to adjust the pre-load on the wave spring arrangement 100.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the illustrated embodiments the force generating component operable to apply the force to the door is accomplished through a knob that is rotatably mounted to the clamping cuff. Alternatively the actuator knob 47 may be mounted for movement relative to the clamping cuff other than in a rotary movement. For instance, the knob may be mounted to slide vertically or horizontally relative to the clamping cuff, with appropriate modification to the actuator surface 48, leaf spring 67, wave spring arrangement 100, and cam plate 110, for instance. In the case of a linear movement, the circumferential features of the force generating components may be arranged linearly so that the linear movement of the actuator knob produces the same force changes described above. Similarly, while the threaded shaft 37 of the height adjustment assembly 34 is integrated with a thumbwheel 35, the thumbwheel can be replaced with another arrangement for rotating the threaded shaft, such as a gear train or lever arrangement.

It is further contemplated that in the macro-adjustment position the force generating component may generate no force or only a minimal force on the door. The minimal force is not sufficient to permit threaded engagement of the threaded shaft to the half-bore of the bearing sleeve.

What is claimed is:

1. A tool support for supporting a power tool at adjustable heights, the power tool having an elongated body supporting a working tool, said tool support comprising:
    a base configured to rest on a work surface;
    a clamping cuff connected to said base, said clamping cuff configured to receive the elongated body of the power tool therethrough at adjustable heights above the work surface;
    a bearing flange associated with the elongated body of the power tool, said bearing flange in sliding engagement with said clamping cuff;
    said clamping cuff defining an opening with said bearing flange accessible through said opening;
    a door movably mounted to said clamping cuff for movement toward said bearing flange through said opening;
    said door and said bearing flange each including a threaded half-bore that together forming a threaded bore when said door is directly adjacent said bearing flange;
    a threaded shaft disposed between said door and said bearing flange and configured to threadedly engage said threaded half-bore in said bearing flange when said door and said bearing flange are directly adjacent such that rotation of said threaded shaft adjusts a height of the elongated body of the power tool relative to said base; and
    an actuator for selectively moving said door and said bearing flange directly adjacent to form said threaded bore.

2. The tool support of claim 1, wherein said door is biased to a position that is not directly adjacent said bearing flange so that said threaded shaft cannot threadedly engage said threaded half-bore of said bearing flange.

3. The tool support of claim 1, wherein said door is pivotably mounted at one end to said clamping cuff by a hinge and said actuator is movably supported on said clamping cuff to engage an end of said door opposite said hinge.

4. The tool support of claim 1, wherein said threaded shaft includes a thumbwheel accessible outside said clamping cuff for manually rotating said threaded shaft.

5. The tool support of claim 1, wherein said threaded shaft is rotatably supported in said door in threaded engagement with said threaded half-bore of said door.

6. The tool support of claim 1, wherein said actuator includes:
    a knob movably mounted on said clamping cuff;
    a force generating component associated with said knob operable at different positions of the knob relative to the clamping cuff to apply a different force on said door pushing said door toward said bearing flange.

7. The tool support of claim 6, wherein said force generating component is configured in a first position to generate no force on said door to permit the elongated body of the power tool body to move substantially freely within said clamping cuff, in a different second position to generate sufficient force to form said threaded bore and to permit threaded engagement of said threaded shaft to said threaded half-bore of said bearing flange, and in a different third position to generate sufficient force to restrict rotation of said threaded shaft within said threaded bore to thereby hold the power tool at a height above said base.

8. The tool support of claim 7, wherein said clamping cuff and said knob include a detent interface to hold said knob in one of first, second and third positions corresponding to said first, second and third positions of said force generating component.

9. The tool support of claim 8, further comprising indicia indicative of said first, second and third positions of said knob.

10. The tool support of claim 6, wherein said force generating component includes a spring.

11. The tool support of claim 10, wherein said spring is a leaf spring.

12. The tool support of claim 11, wherein said force generating component includes:
- a detent projection on said door arranged to contact said leaf spring; and
- said leaf spring is configured to apply a different force on said detent projection depending on the location of a point of contact between said leaf spring and said detent projection.

13. The tool support of claim 12, wherein said leaf spring is fastened at one end to said knob.

14. The tool support of claim 10, wherein said spring is a wave spring.

15. The tool support of claim 14, wherein said force generating component includes:
- a roller rotatably supported on said door;
- a cam plate associated and movable with said knob relative to said roller, wherein said cam plate is disposed between said roller and said wave spring and said wave spring is disposed between said cam plate and said knob, said cam plate having a cam surface configured to variably compress said wave spring between said cam plate and said knob depending on the location of a point of contact between said roller and said cam surface.

16. The tool support of claim 15, wherein said cam surface of said cam plate includes a first zone that is offset from said roller when the knob is in a first position relative to said roller.

17. The tool support of claim 16, wherein said cam surface of said cam plate includes at least two additional successive zones that are in contact with said roller when the knob is in at least two additional different positions relative to said roller in which the wave spring is successively compressed.

18. The tool support of claim 17, wherein said clamping cuff and said knob include a detent interface to hold said knob in one of first and said at least two additional positions corresponding to said first, said additional successive zones of said cam surface of said cam plate.

19. The tool support of claim 18, wherein said detent interface includes:
- a groove corresponding to each of said first and said at least two additional positions of said knob; and
- a detent spring mounted to said clamping cuff and having a detent portion configured to engage said groove.

* * * * *

UNITED STATES PATENT AND TRADEMARK OFFICE
CERTIFICATE OF CORRECTION

| | |
|---|---|
| PATENT NO. | : 10,647,019 B2 |
| APPLICATION NO. | : 15/106125 |
| DATED | : May 12, 2020 |
| INVENTOR(S) | : Timothy L. Truesdale and Arturo Gonzalez |

It is certified that error appears in the above-identified patent and that said Letters Patent is hereby corrected as shown below:

In the Claims

In Claim 7, at Column 10, Line 62, delete the word "body" between the words "tool" and "to".

Signed and Sealed this
Twenty-fourth Day of November, 2020

Andrei Iancu
*Director of the United States Patent and Trademark Office*